United States Patent
Hwang et al.

(10) Patent No.: US 9,973,764 B2
(45) Date of Patent: May 15, 2018

(54) METHOD AND DEVICE FOR TRANSMITTING AND RECEIVING ADVANCED UHD BROADCASTING CONTENT IN DIGITAL BROADCASTING SYSTEM

(71) Applicant: LG ELECTRONICS INC., Seoul (KR)

(72) Inventors: Soojin Hwang, Seoul (KR); Jongyeul Suh, Seoul (KR); Hyunmook Oh, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 14/908,432

(22) PCT Filed: Sep. 5, 2014

(86) PCT No.: PCT/KR2014/008367
§ 371 (c)(1),
(2) Date: Jan. 28, 2016

(87) PCT Pub. No.: WO2015/034306
PCT Pub. Date: Mar. 12, 2015

(65) Prior Publication Data
US 2016/0191929 A1    Jun. 30, 2016

Related U.S. Application Data

(60) Provisional application No. 61/875,124, filed on Sep. 9, 2013.

(51) Int. Cl.
*H04N 19/30* (2014.01)
*H04N 21/2381* (2011.01)
(Continued)

(52) U.S. Cl.
CPC ............ *H04N 19/30* (2014.11); *H04N 19/44* (2014.11); *H04N 21/2381* (2013.01);
(Continued)

(58) Field of Classification Search
CPC .......... H04N 21/4622; H04N 21/8586; H04N 7/17318; H04N 21/4782; H04N 21/4722
See application file for complete search history.

(56) References Cited

U.S. PATENT DOCUMENTS

2010/0198979 A1*  8/2010  Pickens ............. H04L 29/12405
                                                       709/231
2012/0293618 A1* 11/2012  Tsukagoshi ........ H04N 13/0059
                                                        348/43
(Continued)

FOREIGN PATENT DOCUMENTS

JP         10-224799 A      8/1998
JP       2009-267492 A     11/2009
(Continued)

*Primary Examiner* — Benjamin R Bruckart
*Assistant Examiner* — Anthony Bantamoi
(74) *Attorney, Agent, or Firm* — Birch, Stewart, Kolasch & Birch, LLP

(57) ABSTRACT

The present invention relates to a method and a device for transmitting and receiving advanced UHD broadcasting content in a digital broadcasting system. The method for transmitting and receiving advanced UHD broadcasting content, according to one embodiment of the present invention, comprises the steps of: encoding data of a base layer; encoding data of one or more enhancement layers; encoding broadcast network program metadata including information on an advanced UHD broadcast program transmitted through a broadcast network, and encoding IP network program metadata including information on an advanced UHD broadcast program transmitted through an IP network; packetizing the encoded data of the base layer and/or the data of a first enhancement layer into a broadcast packet;

(Continued)

packetizing the encoded data of a second enhancement layer into an IP packet; transmitting the broadcast packet through the broadcast network; and transmitting the IP packet through the IP network.

14 Claims, 23 Drawing Sheets

(51) Int. Cl.
<table>
<tr><td>H04N 21/2343</td><td>(2011.01)</td></tr>
<tr><td>H04N 21/845</td><td>(2011.01)</td></tr>
<tr><td>H04N 19/44</td><td>(2014.01)</td></tr>
<tr><td>H04N 21/236</td><td>(2011.01)</td></tr>
<tr><td>H04N 21/2665</td><td>(2011.01)</td></tr>
<tr><td>H04N 21/434</td><td>(2011.01)</td></tr>
<tr><td>H04N 21/466</td><td>(2011.01)</td></tr>
<tr><td>H04N 21/462</td><td>(2011.01)</td></tr>
<tr><td>H04N 19/70</td><td>(2014.01)</td></tr>
</table>

(52) U.S. Cl.
CPC ............... *H04N 21/23605* (2013.01); *H04N 21/234327* (2013.01); *H04N 21/2665* (2013.01); *H04N 21/4343* (2013.01); *H04N 21/4622* (2013.01); *H04N 21/8451* (2013.01); *H04N 19/70* (2014.11)

(56) References Cited

U.S. PATENT DOCUMENTS

2014/0168512 A1  6/2014  Suh et al.
2015/0020131 A1  1/2015  Choi et al.

FOREIGN PATENT DOCUMENTS

<table>
<tr><td>JP</td><td>2010-258997 A</td><td>11/2010</td><td></td></tr>
<tr><td>JP</td><td>2012-42972 A</td><td>3/2012</td><td></td></tr>
<tr><td>JP</td><td>2012-95053 A</td><td>5/2012</td><td></td></tr>
<tr><td>KR</td><td>10-2013-0018208 A</td><td>2/2013</td><td></td></tr>
<tr><td>WO</td><td>WO 2005055605 A1 *</td><td>6/2005</td><td>..... H04N 21/234327</td></tr>
<tr><td>WO</td><td>WO 2012/086203 A1</td><td>6/2012</td><td></td></tr>
<tr><td>WO</td><td>WO 2012/128563 A2</td><td>9/2012</td><td></td></tr>
<tr><td>WO</td><td>WO 2013/015596 A2</td><td>1/2013</td><td></td></tr>
<tr><td>WO</td><td>WO 2013/062175 A1</td><td>5/2013</td><td></td></tr>
<tr><td>WO</td><td>WO 2013/077670 A1</td><td>5/2013</td><td></td></tr>
<tr><td>WO</td><td>WO 2013/108954 A1</td><td>7/2013</td><td></td></tr>
</table>

* cited by examiner

FIG. 8

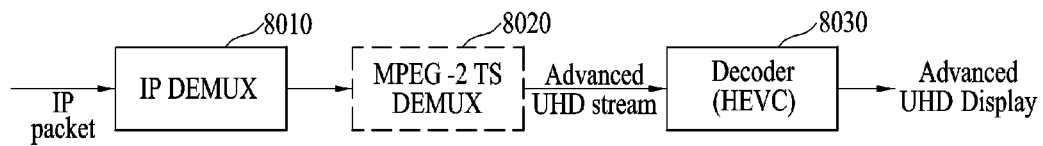

FIG. 9

| Syntax | No. of bits | Format |
|---|---|---|
| UHD_program_descriptor ( ) { | | |
|     descriptor_tag | 8 | uimsbf |
|     descriptor_length | 8 | uimsbf |
|     base_layer_program_type | 4 | uimsbf |
|     num_layer | 4 | uimsbf |
|     for(i=0; i<num_layer; i++){ | | |
|         layer_ID | 8 | uimsbf |
|         stream_type | 8 | uimsbf |
|         reserved | 3 | '111' |
|         elementary_PID | 13 | uimsbf |
|         reserved | 2 | '11' |
|         scalable_type | 6 | uimsbf |
|     } | | |
|     layer_combination_type | 8 | uimsbf |
|     combination_resolution | 4 | uimsbf |
|     combination_frame_rate | 4 | uimsbf |
|     combination_bit_depth | 4 | uimsbf |
|     combination_chroma_subsampling | 4 | uimsbf |
|     combination_color_gamut | 4 | uimsbf |
|     combination_HDR | 4 | uimsbf |
| } | | |

FIG. 12

| UHD_program_type | Description |
|---|---|
| 0000 | UHD - A (3840x2160, 30fps, 8bit, 4:2:0, BT.709, conventional HDR) |
| 0001 | UHD - B (3840x2160, 60fps, 8bit, 4:2:0, BT.709, conventional HDR) |
| 0010 | UHD - C (3840x2160, 60fps, 10bit, 4:2:0, BT.709, conventional HDR) |
| 0011 | UHD - D (3840x2160, 120fps, 10bit, 4:2:0, BT.709, conventional HDR) |
| 0100-0111 | reserved |

FIG. 13

| | resolution | Frame rate | bit-depth | chroma subsampling | Color gamut | HDR |
|---|---|---|---|---|---|---|
| Scalable item provided one from corresponding layer | X | O | O | X | X | X |
| scalable_type | 0 | 1 | 1 | 0 | 0 | 0 |

FIG. 14

| Layer | Base layer | Enhancement layer 1 | ... | Enhancement layer 3 | Enhancement layer 4 | ... | Enhancement layer 7 |
|---|---|---|---|---|---|---|---|
| Scalable item of current program | O | X | ... | X | X | ... | O |
| layer_combination_type | 1 | 0 | ... | 0 | 0 | ... | 1 |

FIG. 15

| Syntax | No. of bits | Format |
|---|---|---|
| UHD_program_descriptor ( ) { | | |
|     descriptor_tag | 8 | uimsbf |
|     descriptor_length | 8 | uimsbf |
|     base_layer_program_type | 4 | uimsbf |
|     num_layer | 4 | uimsbf |
|     for(i=0; i<num_layer; i++){ | | |
|         layer_ID | 8 | uimsbf |
|         stream_type | 8 | uimsbf |
|         reserved | 3 | '111' |
|         elementary_PID | 13 | uimsbf |
|         reserved | 2 | '11' |
|         scalable_type | 6 | uimsbf |
|     } | | |
|     num_layer_combination | 8 | uimsbf |
|     for(i=0; i<num_layer_combination; i++){ | | |
|         layer_combination_type | 8 | uimsbf |
|         combination_resolution | 4 | uimsbf |
|         combination_frame_rate | 4 | uimsbf |
|         combination_bit_depth | 4 | uimsbf |
|         combination_chroma_subsampling | 4 | uimsbf |
|         combination_color_gamut | 4 | uimsbf |
|         combination_HDR | 4 | uimsbf |
|     } | | |
| } | | |

FIG. 17

| Syntax | No. of bits | Format |
|---|---|---|
| enhancement_program_descriptor ( ) { | | |
|     descriptor_tag | 8 | uimsbf |
|     descriptor_length | 8 | uimsbf |
|     reserved | 6 | '111111' |
|     is_scalable_flag | 1 | |
|     is_IP_service_on | 1 | |
|     if(is_scalable_flag =0){ | | |
|         UHD_resolution | 4 | uimsbf |
|         UHD_frame_rate | 4 | uimsbf |
|         UHD_bit_depth | 4 | uimsbf |
|         UHD_chroma_subsampling | 4 | uimsbf |
|         UHD_color_gamut | 4 | uimsbf |
|         UHD_HDR | 4 | uimsbf |
|         if(is_IP_service_on = 1) | | |
|             ip_linkage_info ( ) | | |
|         else | | |
|             channel_likage_info ( ) | | |
|     } | | |
|     else if(is_scalable_flag = 1){ | | |
|         reserved | 4 | '1111' |
|         num_layer | 4 | uimsbf |
|         for(i=0; i<num_layer; i++){ | | |
|             layer_ID | 8 | uimsbf |
|             reserved | 3 | '111' |
|             elementary_PID | 13 | uimsbf |
|             layer_path | 2 | uimsbf |
|             service_type | 6 | uimsbf |
|             if(is_IP_service_on = 1) | | |
|                 ip_linkage_info ( ) | | |
|             else | | |
|                 channel_likage_info ( ) | | |
|         } | | |
|         num_layer_combination | 8 | uimsbf |
|         for(i=0; i<num_layer_combination; i++){ | | |
|             layer_combination_type | 8 | uimsbf |
|             combination_resolution | 4 | uimsbf |
|             combination_frame_rate | 4 | uimsbf |
|             combination_bit_depth | 4 | uimsbf |
|             combination_chroma_subsampling | 4 | uimsbf |
|             combination_color_gamut | 4 | uimsbf |
|             combination_HDR | 4 | uimsbf |
|         } | | |
|     } | | |
| } | | |

FIG. 18

| layer_path | Description |
|---|---|
| 00 | reserved |
| 01 | Same channel |
| 10 | Different channel |
| 11 | IP network |

FIG. 20

| Syntax | No. of bits | Format |
|---|---|---|
| ip_linkage_info ( ) { | | |
|    descriptor_tag | 8 | uimsbf |
|    descriptor_length | 8 | uimsbf |
|    IP_address_type | 2 | uimsbf |
|    reserved | 5 | '11111' |
|    if(IP_address_type == 00) { | | |
|       IPv4_address | 32 | uimsbf |
|       reserved | 92 | |
|    } | | |
|    else if (IP_address_type ==01) IPv6_IP_address | 128 | uimsbf |
|    port_number | 16 | uimsbf |
|    EL_URI_length | 8 | uimsbf |
|     for (i=0; i<EL_URL_length; i++) { | | |
|       EL_URI_byte | var | 8*N |
|     } | | |
| } | | |

FIG. 21

| IP_address_type | Description |
|---|---|
| 00 | IPv4 (32bit) |
| 01 | IPv6 (128bit) |
| 10 - 11 | reserved |

FIG. 22

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reseved | 3 | bslbf |
|     RCR_PID | 13 | uimsbf |
|     reseved | 4 | bslbf |
|     program_info_length | 12 | uimsbf |
|     for (i=0; i<N; i++) { | | |
|         descriptor() | | |
|     } | | |
|     for (i=0; i<N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i<N; i++) { | | |
|             descriptor() | | |
|         } | | |
|     } | | |
|     CRC_32 | 32 | rpchof |
| } | | |

FIG. 23

| Syntax | No. of bits | Identifier |
|---|---|---|
| service_description_section () { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i=0; i<N; i++) { | | |
|         reservice_id | 16 | uimsbf |
|         reserved_future_use | 6 | bslbf |
|         EIT_schedule_flag | 1 | bslbf |
|         EIT_present_following_flag | 1 | bslbf |
|         running-status | 3 | uimsbf |
|         free_CA_mode | 1 | bslbf |
|         descriptors_loop_length | 12 | uimsbf |
|         for (j=0; j<N; j++) { | | |
|             descriptor () | | |
|         } | | |
|     } | | |
|     CRC_32 | 32 | rpchof |
| } | | |

FIG. 24

| Syntax | No. of bits | Identifier |
|---|---|---|
| event_information_section () { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i=0; i<N; i++) { | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptors_loop_length | 12 | uimsbf |
|         descriptor () | | |
|         } | | |
|     } | | |
|     CRC_32 | 32 | rpchof |
| } | | |

FIG. 25

| Syntax | No. of bits | Format |
|---|---|---|
| terrestrial_virtual_channel_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=o; i< num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequecy | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     sevice_type | 6 | uimsbf |
|     source_id | 16 | uimsbf |
|     reserved | 6 | '111111' |
|     descriptors_length | 10 | uimsbf |
|     for(i=0; i<N; i++) { | | |
|       descriptor() | | |
|     } | | |
|   } | | |
| } | | |

FIG. 26

| Syntax | No. of bits | Format |
|---|---|---|
| cable_virtual_channel_table_section () { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=o; i< num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     path_select | 1 | bslbf |
|     out_of_band | 1 | bslbf |
|     hide_guide | 1 | bslbf |
|     reserved | 3 | '111' |
|     sevice_type | 6 | uimsbf |
|     source_id | 16 | uimsbf |
|     reserved | 6 | '111111' |
|     descriptors_length | 10 | uimsbf |
|     for(i=0; i<N; i++) { | | |
|       descriptor() | | |
|     } | | |
|   } | | |
| } | | |

METHOD AND DEVICE FOR TRANSMITTING AND RECEIVING ADVANCED UHD BROADCASTING CONTENT IN DIGITAL BROADCASTING SYSTEM

CROSS REFERENCE TO RELATED APPLICATIONS

This application is the National Phase of PCT International Application No. PCT/KR2014/008367, filed on Sep. 5, 2014, which claims priority under 35 U.S.C. 119(e) to U.S. Provisional Application No. 61/875,124, filed on Sep. 9, 2013, all of which are hereby expressly incorporated by reference into the present application.

FIELD OF THE INVENTION

The present invention relates to a broadcasting system. And, more specifically, the present invention relates to a method and/or device for transmitting and receiving advanced UHD broadcasting content in a digital broadcasting system.

BACKGROUND ART

With the evolution in the digital technology and the communication technology, the supply and demand of audio/video based multimedia content is expanding at a fast rate in diverse areas, such as broadcasting and movies as well as Internet and personal media, and so on. Furthermore, as 3DTV/3D movies (or films) providing volumetric (or three-dimensional) viewing through broadcast or movies have become more common, consumer demand for realistic media providing a sense of reality and a sense of presence has been increasing. Moreover, along with the evolution in the display technology, as TV screens in general households have become more large-sized, expense in enjoying advanced and realistic HD content (or more advanced content) is also growing. Accordingly, as a means for preparing for the Post-HDTV market, interest is growing on realistic broadcasting, such as 3DTV as well as UHDTV (Ultra High Definition TV), as the next generation broadcasting service, and, most particularly, discussions are being extensively made on UHD (Ultra High Definition) broadcasting services.

Since the UHD broadcasting content provides content more advanced than SD or HD broadcasting content, the data size that is to be transmitted is relatively larger. In transmitting such UHD broadcasting content, since the current terrestrial wave uses the 8-VSB modulation scheme, data of a maximum of 19.39 Mbps may be transmitted, and, since Cable uses the J.83b scheme, a maximum of 38.8 Mbps may be transmitted. More specifically, according to a simple calculation, in case of transmitting a basic (or essential) UHD service through a terrestrial broadcasting network (or broadcast network) or a cable network, a data size of 20 Mbps is expected. Therefore, in order to provide advanced UHD services and not essential UHD services, problems may occur in that additional channels are required to be allocated or that the transmission method is required to be changed.

Furthermore, in a multimedia service environment, heterogeneous networks (3G/LTE, Wi-Fi, wired LAN, terrestrial broadcasting network, cable network) having diverse bandwidths, protocol, QoS (Quality of Service) co-exist, and differences in the performance and accessibility of user equipments (TV, desktop (computer), notebook, tablet PC, smart phone) are growing. In order to access/consume multimedia content in such environment, a video coding method (or scheme) for dealing with such diverse networks and user environments is required.

DETAILED DESCRIPTION OF THE INVENTION

Technical Objects

An object that is to be achieved by the present invention is to resolve the above-described problem, and the object is to provide a method and/or device for transmitting and receiving advanced UHD broadcasting content through a terrestrial broadcasting network (or broadcast network) and/or an internet network.

Moreover, an object that is to be achieved by the present invention is to provide a method and/or device for transmitting and receiving advanced UHD broadcasting content, which is encoded by using a scalable codec.

Furthermore, an object that is to be achieved by the present invention is to provide a method for signaling information on advanced UHD broadcasting content, which is encoded by using a scalable codec.

Technical Solutions

A method for transmitting advanced UHD broadcasting content according to an exemplary embodiment of the present invention includes the steps of encoding data of a base layer configuring an essential UHD broadcasting program, encoding data of one or more enhancement layers including supplemental information, the supplemental information being required for providing the advanced UHD broadcasting program based upon the data of the base layer, encoding broadcasting network program metadata including information on the advanced UHD broadcasting program being transmitted through a broadcasting network and IP network program metadata including information on advanced UHD broadcasting program being transmitted through an IP network, packetizing the encoded data of the base layer and/or the encoded data of a first enhancement layer, among the one or more enhancement layers, to a broadcasting packet; packetizing the encoded data of a second enhancement layer, among the one or more enhancement layers, to an IP packet, transmitting the broadcasting packet through the broadcasting network, and transmitting the IP packet through the IP network.

Preferably, the broadcasting network program metadata may include at least any one of program type information indicating a type of UHD broadcasting program that is capable of finally being provided by the data of the layer being transmitted through the broadcasting network, number of layer information indicating a number of layers being transmitted through the broadcasting network, number of layer combination information indicating a number of layer combinations being transmitted through the broadcasting network, and layer combination type information indicating combination information of layers being transmitted through the broadcasting network.

Preferably, the broadcasting network program metadata may include at least any one of layer identification information identifying each layer being transmitted through the broadcasting network, layer encoding type information indicating the codec type used by each layer being transmitted through the broadcasting network, layer elementary stream packet identification information indicating packet identification information of an elementary stream including the data of each layer being transmitted through the broadcasting network, and scalable type information indicating scalable items that are capable of being simultaneously provided by each layer being transmitted through the broadcasting network.

Preferably, the IP network program metadata may include at least any one of Is scalable flag information indicating whether or not the data of the layer being transmitted through the IP network is encoded by using a scalable codec, number of IP network layer information indicating the number of layers being transmitted through the IP network, number of IP network layer combination information indicating the number of layer combinations being transmitted through the IP network, and IP network layer combination type information indicating combination information of the layers being transmitted through the IP network.

Preferably, the IP network program metadata may include at least any one of IP network layer identification information identifying each layer being transmitted through the IP network, IP network elementary stream packet identification information indicating packet identification information of the elementary stream including the data of each layer being transmitted through the IP network, and IP linkage information indicating information on a transmission path of the data of each layer being transmitted through the IP network.

Preferably, the IP linkage information may include at least any one of IP address type information indicating a type of IP address that is capable of receiving the data of each layer being transmitted through the IP network, IP address information indicating an IP address having an IP address type respective to the IP address type information, and port number information indicating a UDP port number that is capable of receiving the data of each layer being transmitted through the IP network.

Preferably, the broadcasting network program metadata and IP network program metadata may be included a PMT, a SDT, an EIT, a TVCT, or a CVCT in a descriptor format and transmitted.

A device for receiving advanced UHD broadcasting content according to another exemplary embodiment of the present invention includes a first receiving unit configured to receive, through a broadcasting network, data of a base layer configuring an essential UHD broadcasting program and/or data of a first enhancement layer, among one or more enhancement layers, including supplemental information, the supplemental information being required for providing the advanced UHD broadcasting program based upon the data of the base layer, wherein the first receiving unit receives broadcasting network program metadata including information on the advanced UHD broadcasting program being transmitted through the broadcasting network and IP network program metadata including information on advanced UHD broadcasting program being transmitted through the IP network, a second receiving unit configured to receive, through an IP network, a data of a second enhancement layer, among the one or more enhancement layers, a first decoder configured to decode the data of the base layer and/or the data of the first enhancement layer received by the first receiving unit, a second decoder configured to decode the data of the second enhancement layer received by the second receiving unit, and a playing unit configured to play the advanced UHD broadcasting program provided by the decoded data of the base layer and the decoded data of the one or more enhancement layers.

Preferably, the broadcasting network program metadata may include at least any one of program type information indicating a type of UHD broadcasting program that is capable of finally being provided by the data of the layer being received through the broadcasting network, number of layer information indicating a number of layers being received through the broadcasting network, number of layer combination information indicating a number of layer combinations being received through the broadcasting network, and layer combination type information indicating combination information of layers being received through the broadcasting network.

Preferably, the broadcasting network program metadata may include at least any one of layer identification information identifying each layer being received through the broadcasting network, layer encoding type information indicating the codec type used by each layer being received through the broadcasting network, layer elementary stream packet identification information indicating packet identification information of an elementary stream including the data of each layer being received through the broadcasting network, and scalable type information indicating scalable items that are capable of being simultaneously provided by each layer being received through the broadcasting network.

Preferably, the IP network program metadata may include at least any one of Is scalable flag information indicating whether or not the data of the layer being received through the IP network is encoded by using a scalable codec, number of IP network layer information indicating the number of layers being received through the IP network, number of IP network layer combination information indicating the number of layer combinations being received through the IP network, and IP network layer combination type information indicating combination information of the layers being received through the IP network.

Preferably, the IP network program metadata may include at least any one of IP network layer identification information identifying each layer being received through the IP network, IP network elementary stream packet identification information indicating packet identification information of the elementary stream including the data of each layer being received through the IP network, and IP linkage information indicating information on a transmission path of the data of each layer being received through the IP network.

Preferably, the IP linkage information may include at least any one of IP address type information indicating a type of IP address that is capable of acquiring the data of each layer being received through the IP network, IP address information indicating an IP address having an IP address type respective to the IP address type information, and port number information indicating a UDP port number that is capable of acquiring the data of each layer being received through the IP network.

Preferably, the broadcasting network program metadata and IP network program metadata may be included a PMT, a SDT, an EIT, a TVCT, or a CVCT in a descriptor format and received.

Effects of the Invention

According to the present invention, advanced UHD broadcasting content may be transmitted and received through a terrestrial broadcasting network and/or an internet network.

According to the present invention, in order to transmit advanced UHD broadcasting content by additionally using an Internet network along with the conventional terrestrial broadcasting network or cable network, limitations of restricted bandwidths may be overcome.

According to the present invention, by overcoming the limitation in the bandwidths with the use of the Internet network, instead of UHD content having only its resolution scaled, advanced UHD content having its overall performance enhanced may be provided.

According to the present invention, the advanced UHD broadcasting content may be layered to multiple layers and may then be transmitted and received layer by layer.

According to the present invention, by transmitting the advanced UHD broadcasting content layer by layer, the advanced UHD broadcasting content may be received/played by diverse user equipments.

BRIEF DESCRIPTION OF THE DRAWINGS

FIG. 8 illustrates a device for receiving advanced UHD broadcasting content, in case the advanced UHD broadcasting content is transmitted as a single layer stream according to an exemplary embodiment of the present invention.

FIG. 9 illustrates a syntax of a broadcasting network program descriptor (UHD program descriptor) including broadcasting network program metadata, according to an exemplary embodiment of the present invention.

FIG. 12 illustrates a UHD broadcasting program type indicated by layer program type information (base_layer_program_type) according to an exemplary embodiment of the present invention.

FIG. 13 illustrates scalable type information (scalable_type) according to an exemplary embodiment of the present invention.

FIG. 14 illustrates layer combination type information (layer_combination_type) according to an exemplary embodiment of the present invention.

FIG. 15 illustrates a syntax of a broadcasting network program descriptor (UHD program descriptor) including broadcasting network program metadata having number of layer combinations information (num_layer_combination) added thereto according to an exemplary embodiment of the present invention.

FIG. 17 illustrates a syntax of an IP network program descriptor (enhancement program descriptor) including IP network program metadata according to an exemplary embodiment of the present invention.

FIG. 18 illustrates a significance respective to a value indicated by layer path information (layer_path) according to an exemplary embodiment of the present invention.

FIG. 20 illustrates a syntax of internet connection (or linkage) information (ip_linkage_info) according to an exemplary embodiment of the present invention.

FIG. 21 illustrates IP address type information (IP_address_type) according to an exemplary embodiment of the present invention.

FIG. 22 illustrates a syntax of a PMT (Program Map Table) according to an exemplary embodiment of the present invention.

FIG. 23 illustrates a syntax of a SDT (Service Description Table) according to an exemplary embodiment of the present invention.

FIG. 24 illustrates a syntax of an EIT (Event Information Table) according to an exemplary embodiment of the present invention.

FIG. 25 illustrates a syntax of a TVCT (Terrestrial Virtual Channel Table) according to an exemplary embodiment of the present invention.

FIG. 26 illustrates a syntax of a CVCT (Cable Virtual Channel Table) according to an exemplary embodiment of the present invention.

BEST MODE FOR CARRYING OUT THE PRESENT INVENTION

Figure 1:
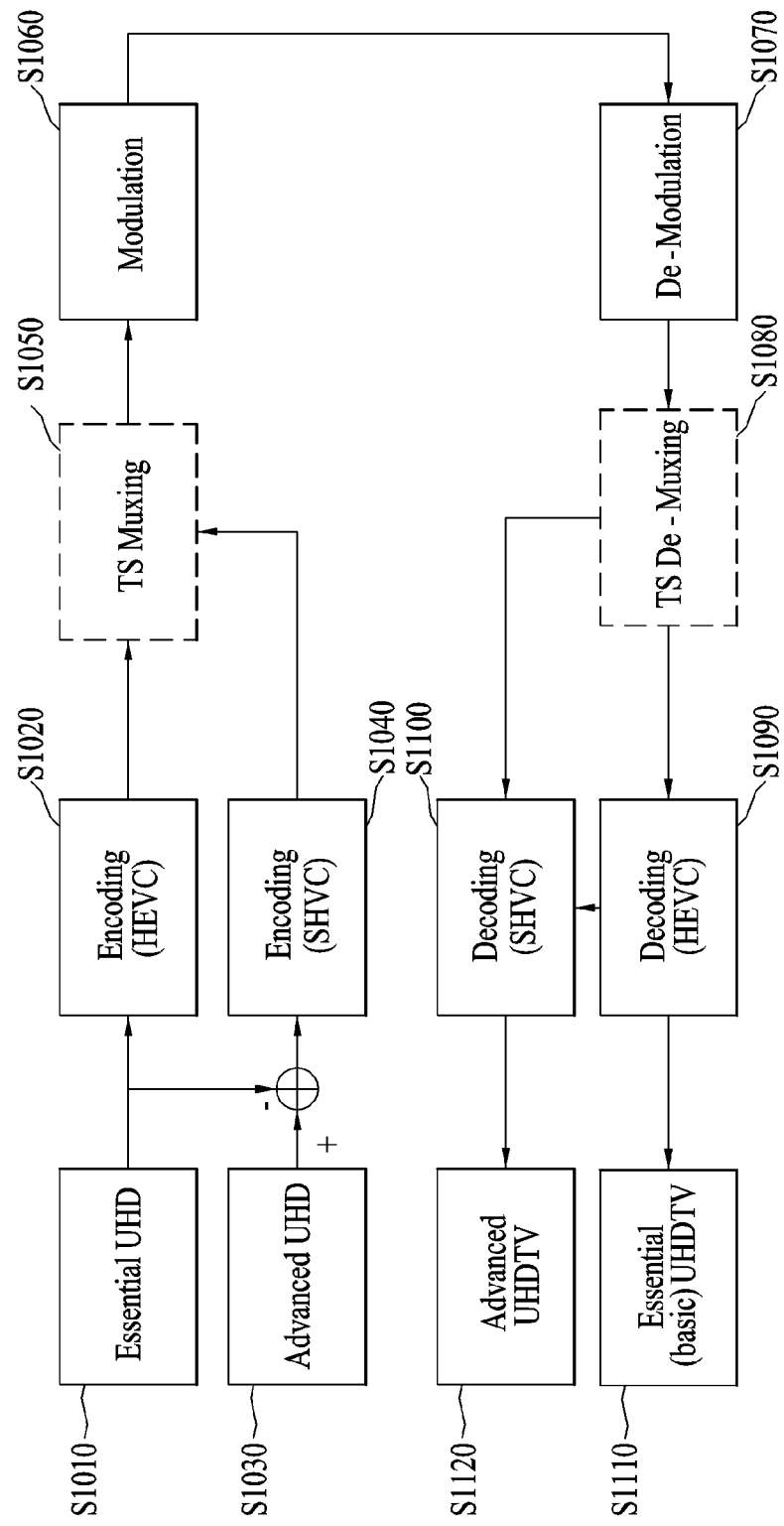
FIG. 1 illustrates a method for transmitting and receiving advanced UHD broadcasting content through a terrestrial broadcasting network or a cable network according to an exemplary embodiment of the present invention.

The preferred embodiments of the present invention will now be described in detail with reference to the accompanying drawings and the details given in the accompanying drawings. However, the present invention will not be limited only to the preferred embodiments described herein.

Although the terms used in this specification are selected from generally known and used terms based upon the function of the present invention, some of the terms mentioned in this specification may be varied by anyone skilled in the art at his or her discretion, according to custom, or due to the advent of new technologies. Also, in some cases, some of the terms mentioned herein have been selected by the applicant at his or her discretion. And, in these cases, the detailed meanings shall be described in relevant parts of the description of the present invention. Therefore, it is required that the terms used in the description of this specification are understood not simply by the mere naming of the terms used herein but by the actual meaning of each term lying within and, also, based upon the overall content of this specification.

For the convenience in the understanding and description of the present invention, terms and abbreviations will be defined as described below.

UHD TV (Ultra High Definition TV) refers to broadcasting having picture quality four times more vivid than Full HD broadcasting. In HD broadcasting, pores on a human skin can be vaguely seen, whereas, in UHD broadcasting, skin pores as well as soft and downy hair on the skin of little children may also be seen.

Essential UHD refers to a relative picture quality in comparison to the Advanced UHD, which will be described later on, and this refers to UHD providing essential picture quality (or definition). Essential UHD may also be referred to as basic resolution UHD.

Advanced UHD refers to UHD having more enhanced resolution, frame rate, color gamut, and so on, as compared to the above-described Essential UHD. Advanced UHD may also be referred to as high resolution UHD.

HEVC (High Efficiency Video Coding) corresponds to a high efficiency video coding standard, which provides a compression rate 2 times higher than the conventional H.264/MPEG-4 AVC technique, while providing the same video quality as the conventional H.264/MPEG-4 AVC technique.

SHVC (Scalable HEVC) corresponds to a video coding technique having Scalability added to the above-described HEVC compression technique.

TS (Transport Stream) corresponds to an abbreviation for MPEG transport stream, which refers to a communication protocol for audio, video, and data transmission (or transport). TS may also be referred to as a transport stream.

VSB (Vestigial Side Band) corresponds to one of the radio wave modulation schemes, which corresponds to a digital TV transmission scheme standard of the United States of America. Advanced digital broadcasting is advantageous, in that, due to its frequency bandwidth applicability, the viewing range may be increased to its maximum level, and interference with analog signals may be minimized.

QAM (Quadrature Amplitude Modulation) corresponds to one of the radio wave modulation schemes, which corresponds to a modulation scheme using a combination of amplitude and phase.

In case data are compressed and then transmitted, PCR (Program Clock Reference) refers to reference time information used by the system.

In case video signal and audio signal are compressed and then transmitted, DTS (Decoding Time Stamp) refers to information designating a decoding time in order to prevent video and audio mismatch by the receiver.

In case video signal and audio signal are compressed and then transmitted, PTS (Presentation Time Stamp) refers to information designating an outputting time after decoding the video or audio signal by the receiver.

PSI/SI (Program Specific Information/Service Information) corresponds to a standard created by DVB in order to describe programs and data being transmitted from the digital TV and diverse information required for TV reception.

PSIP (Program and System Information Protocol) corresponds to a standard created by ATSC in order to describe programs and data being transmitted from the digital TV and diverse information required for TV reception.

RTP (Real-time Transport Protocol) corresponds to a transmission layer communication protocol for transmitting/receiving audio or video in real time.

UDP (User Datagram Protocol) corresponds to a communication protocol using a method performing one-way transmission from one party instead of a format of transmitting and receiving information to and from one another, when exchanging information through the Internet.

IP (Internet Protocol) corresponds to a protocol that is used for sending data from one computer to another computer over the Internet.

FIG. 1 illustrates a method for transmitting and receiving advanced UHD broadcasting content through a terrestrial broadcasting network or a cable network according to an exemplary embodiment of the present invention.

The method for transmitting and receiving advanced UHD broadcasting content through a terrestrial broadcasting network or a cable network according to the exemplary embodiment of the present invention includes a step of encoding basic picture quality UHD data (Essential UHD data) (S1010) (S1020), a step of encoding Advanced UHD data (S1030) (S1040), a step of performing demultiplexing (S1050), a step of performing modulation (S1060), a step of performing demodulation (S1070), a step of performing demultiplexing (S1080), a step of decoding Essential UHD data (S1090), a step of decoding Advanced UHD data (S1100), a step of playing decoded Essential UHD data (S1110), and/or a step of playing decoded Advanced UHD data (S1120).

The Essential UHD data (S1010) refer to data configuring UHD content having basic specifications.

The Advanced UHD data (S1030) refer to data configuring advanced UHD content. More specifically, this may refer to UHD data having more enhanced picture quality as compared to the above-described Essential UHD data.

In the step of encoding Essential UHD data (S1020), the Essential UHD data may be encoded by using a HEVC scheme.

In the step of encoding Advanced UHD data (S1040), the Advanced UHD data may be encoded by using a SHVC scheme. Herein, reference may be made to the Essential UHD data during the process of encoding the Advanced UHD data.

In the step of performing demultiplexing (S1050), the Essential UHD data and the Advanced UHD data may be multiplexed to one transport stream. Herein, in case a transport packet is not used, the step of performing multiplexing to a transport stream (S1050) may be omitted or may be replaced with another process step. For example, in case UHD data are transmitted through an IP network instead of a conventional broadcasting network, the above-described step of performing multiplexing (S1050) may be omitted or may be replaced with another process step.

In the step of performing modulation (S1060), the UHD data that are multiplexed to a transport stream may be modulated by using diverse modulation schemes and may then be transmitted to a receiving end.

In the step of performing demodulation (S1070), the transport stream that is modulated and transmitted may be demodulated.

In the step of performing demultiplexing (S1080) the demodulated transport stream may be demultiplexed to multiple unit streams.

In the step of decoding Essential UHD data (S1090), the Essential UHD data may be decoded by using a HEVC scheme.

In the step of decoding Advanced UHD data (S1100), the Advanced UHD data may be decoded by using a SHVC scheme. Herein, reference may be made to the Essential UHD data during the process of decoding the Advanced UHD data.

In the step of playing decoded Essential UHD data (S1110), the decoded Essential UHD data may be played by an Essential UHDTV.

In the step of playing decoded Advanced UHD data (S1120), the decoded Advanced UHD data may be played by an Advanced UHDTV.

This drawing shows an exemplary embodiment of transmitting UHD data through a terrestrial broadcasting network or a cable network by using the SHVC scheme in order to provide an Advanced UHD service. The Essential UHD data, which correspond to a base, may be encoded as a base layer, and the remaining data, which configure the Advanced UHD content, may be encoded as an enhancement layer. The encoded Essential UHD data and the encoded Advanced UHD data may be transmitted to the receiving end through the same channel or through different channels.

Figure 2:
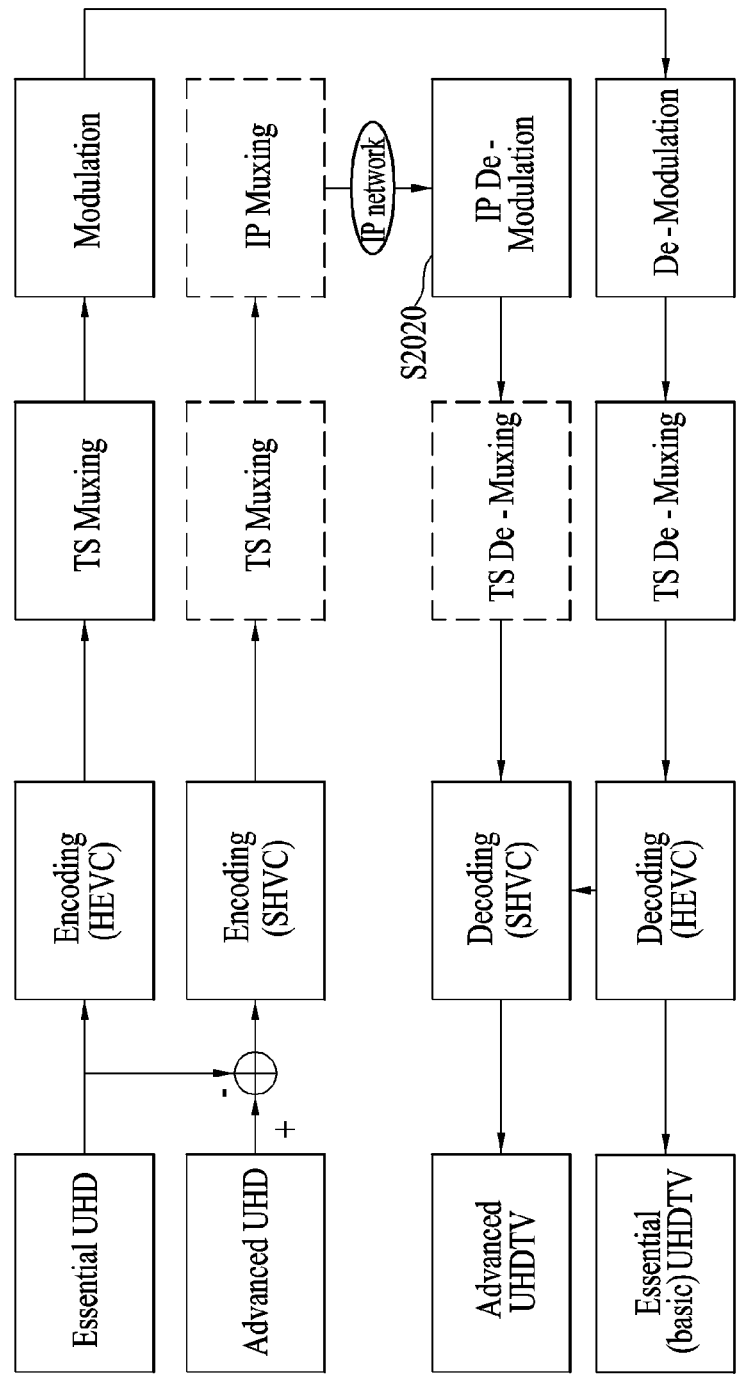
FIG. 2 illustrates a method for transmitting and receiving advanced UHD broadcasting content through a conventional broadcasting network (terrestrial broadcasting network or cable network) and an IP network according to an exemplary embodiment of the present invention.

FIG. 2 illustrates a method for transmitting and receiving advanced UHD broadcasting content through a conventional broadcasting network (terrestrial broadcasting network or cable network) and an IP network according to an exemplary embodiment of the present invention.

This drawing shows an exemplary embodiment of transmitting Advanced UHD content and Essential UHD content by using the conventional broadcasting network (i.e., the terrestrial broadcasting network or the cable network) and the IP network (Internet network), i.e., by using two different s. The Essential UHD data, which correspond to a base, may be encoded as a base layer, and the remaining data, which configure the Advanced UHD content, may be encoded as an enhancement layer. The encoded Essential UHD data and the encoded Advanced UHD data may be transmitted to the receiving end through the same channel or through different channels.

In this drawing, the Advanced UHD data that are encoded as the enhancement layer may be multiplexed to a transport stream. The multiplexed transport stream may be packetized to an Internet Protocol (IP) format in a step of performing IP Muxing (S2010). The IP packet, which is created by the step of performing IP Muxing (S2010), may be transmitted to the receiving end through the Internet network. In a step of performing IP demultiplexing (or Demuxing) (S2020), the received IP packet may be demultiplexed, an IP header may be removed, and, then, a transport stream may be extracted.

In this drawing, detailed description of the process steps excluding the step of performing IP Muxing (S2010) and the step of performing IP demultiplexing (or Demuxing) (S2020) may be replaced by the description each of the respective process steps configuring the above-described method for transmitting and receiving advanced UI-ID broadcasting content through a terrestrial broadcasting network or a cable network.

Figure 3:
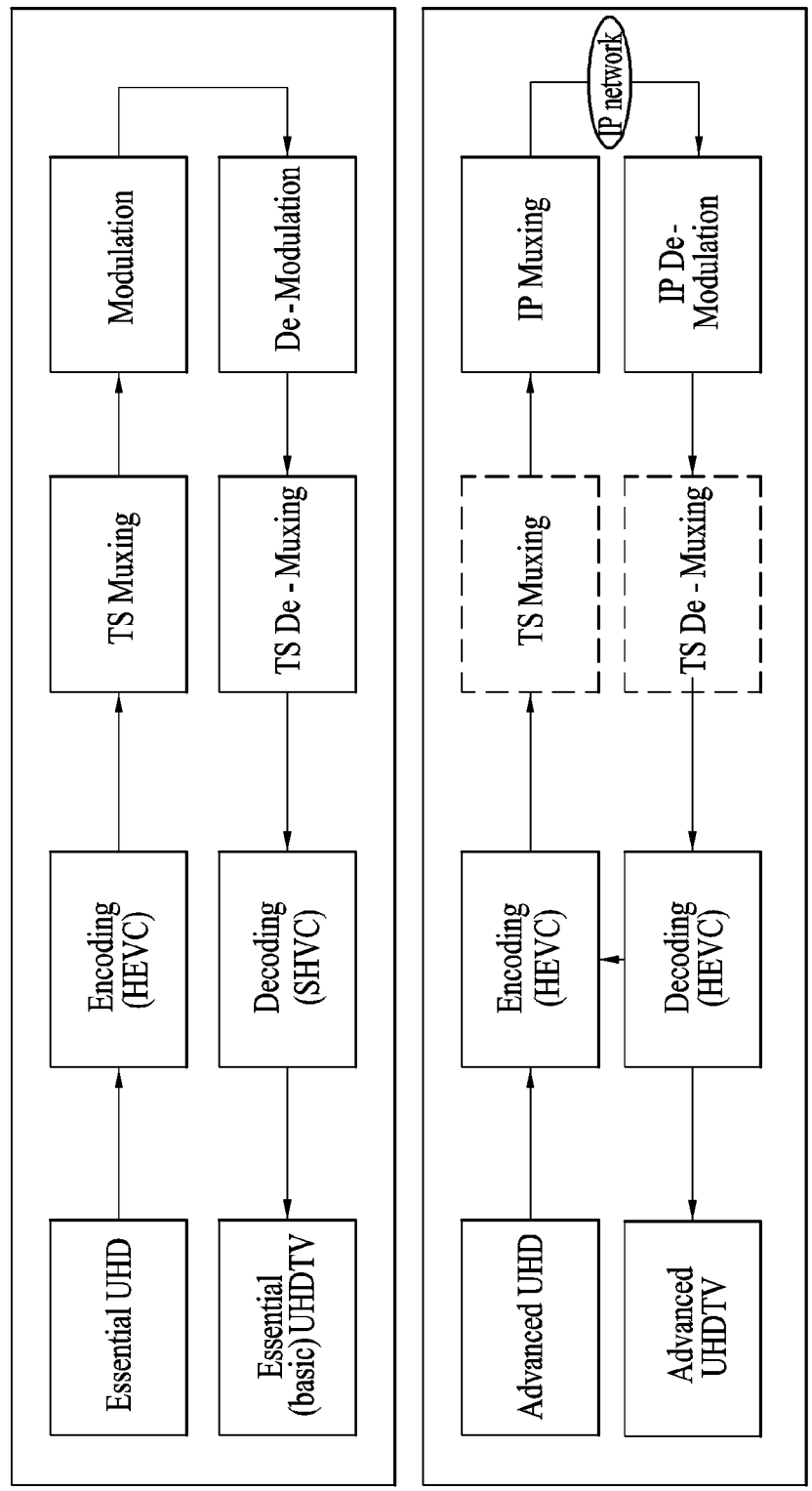
FIG. 3 illustrates a method for independently transmitting and receiving advanced UHD broadcasting content through each of an IP network and a conventional broadcasting network (terrestrial broadcasting network or cable network) according to an exemplary embodiment of the present invention.

FIG. 3 illustrates a method for independently transmitting and receiving advanced UHD broadcasting content through each of an IP network and a conventional broadcasting network (terrestrial broadcasting network or cable network) according to an exemplary embodiment of the present invention.

According to the method for independently transmitting and receiving advanced UHD broadcasting content through each of an IP network and a conventional broadcasting network (terrestrial broadcasting network or a cable network) according to the exemplary embodiment of the present invention, UHD broadcast is serviced through each of the conventional broadcasting network (terrestrial broadcasting network or cable network) and the IP network (Internet network), and the user may select a wanted service from the two services being transmitted through each network, and, then, the user may view the UHD broadcast.

In this drawing, the Essential UHD content may be encoded by using the HEVC scheme, and the encoded Essential UHD content may be multiplexed to one transport stream along with other unit streams. The multiplexed transport stream may be modulated by using diverse modulation schemes and may, then, be transmitted to the receiving end. The receiving end may demodulate the received Essential UHD content and may demultiplex the multiplexed transport stream. The Essential UHD content that is extracted by the demultiplexing process may be decoded by using the HEVC scheme, and, then, the decoded Essential UHD content may be played by the Essential UHDTV.

In this drawing, the Advanced UHD content may be encoded by using the HEVC scheme, and the encoded Essential UHD content may be multiplexed to one transport stream along with other unit streams. Herein, in case a transport packet is not used, the process of performing multiplexing to a transport stream may be omitted or may be replaced with another process. The multiplexed transport stream may be packetized to an Internet Protocol format. The created IP packet may be transmitted to the receiving end through the Internet network. The receiving end may demultiplex the received IP packet and may remove an IP header, and, may, then, extract a transport stream. The transport stream may be demultiplexed, and, then, Advanced UHD content may be extracted. Herein, the process of demultiplexing the transport stream may be omitted or may be replaced with another process. The extracted Advanced UHD content may be decoded by using the HEVC scheme, and the decoded Advanced UHD content may be played by the Advanced UHDTV.

In this drawing, detailed description of each block may be replaced by the description each of the respective process steps configuring the above-described method for transmitting and receiving advanced UHD broadcasting content through a terrestrial broadcasting network or a cable network.

Figure 4:
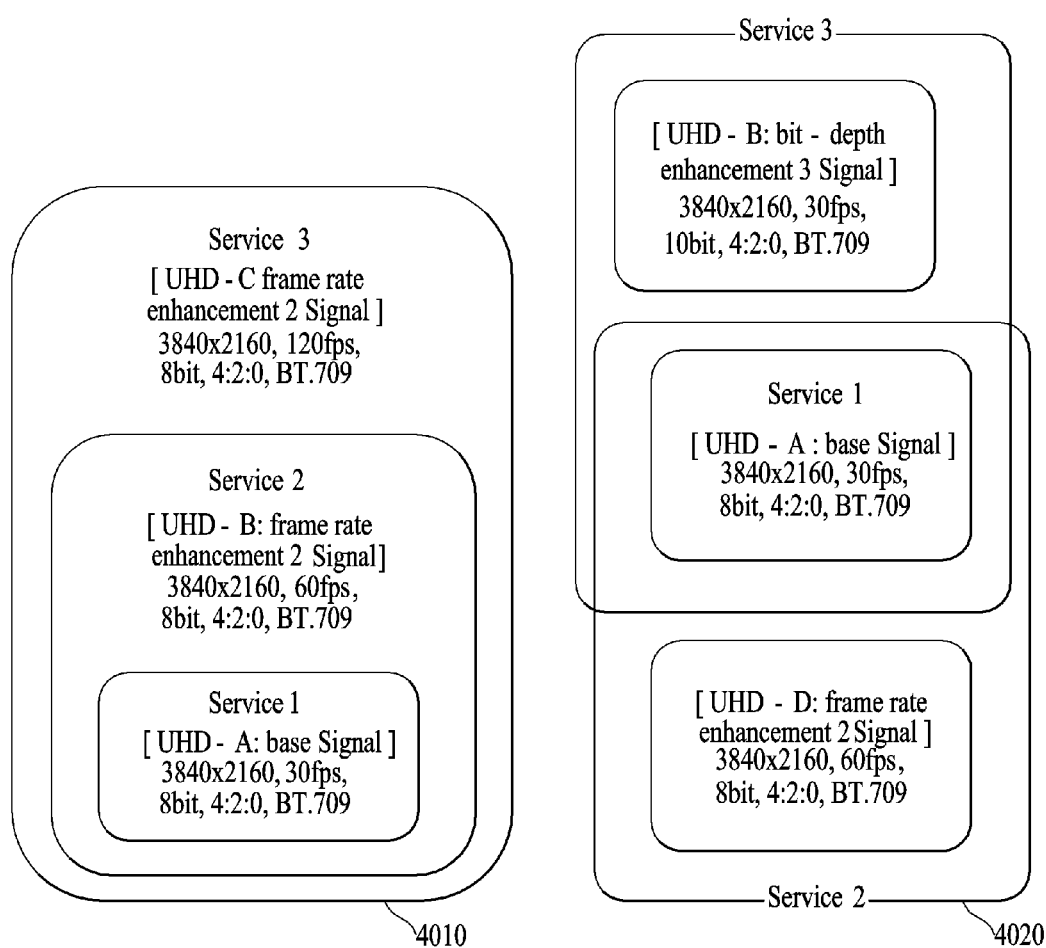
FIG. 4 illustrates a method for configuring a scalable UHD service according to an exemplary embodiment of the present invention.

FIG. 4 illustrates a method for configuring a scalable UHD service according to an exemplary embodiment of the present invention.

In this drawing, the left-side drawing (4010) shows an exemplary embodiment of dividing (or splitting) UHD content into a base layer signal, which corresponds to an essential signal, and an enhancement layer 2 signal, so as to configure a layered structure in order to provide UHD content, and, then, encoding the signals of each layer by using the SHVC scheme. Herein, the enhancement layer 2 may signify an enhancement signal for increasing the frame rate in its relationship with the base layer.

According to the exemplary embodiment of the present invention, in order to provide Service 2, a base layer signal and one enhancement layer 2 signal are required, and, in order to provide Service 3, a base layer signal and two enhancement layer 2 signals are required. Accordingly, the transmitting end may perform signaling that enhancement layer 2 corresponds to an enhancement signal related to the frame rate through broadcasting network program metadata or IP network program metadata, which will be described later on, and the transmitting end may also perform signaling of level information, frame rate information of the base layer or enhancement layer, and, the receiving end may distinguish to which enhancement signal the received enhancement layer signal corresponds through broadcasting network program metadata or IP network program metadata, which will be described later on.

In this drawing, a difference exists between the right-side drawing (4020) and the left-side drawing (4010) in the method for configuring the UHD service. In the aspect of using the SHVC scheme, the right-side drawing (4020) is the same as the left-side drawing (4010). However, in the right-side drawing (4020), Service 2 may be provided by the base layer and the enhancement layer 2 signal for UHD-D services. Similarly, Service 3 may be provided by the base layer and the enhancement layer 3 signal for UHD-B services. Herein, the enhancement layer 2 signal for UHD-D services corresponds to an enhancement signal for increasing the frame rate in its relationship with the base layer, and the enhancement layer 3 signal for UHD-B services corresponds to an enhancement signal for increasing the bit-depth in its relationship with the base layer.

Figure 5:
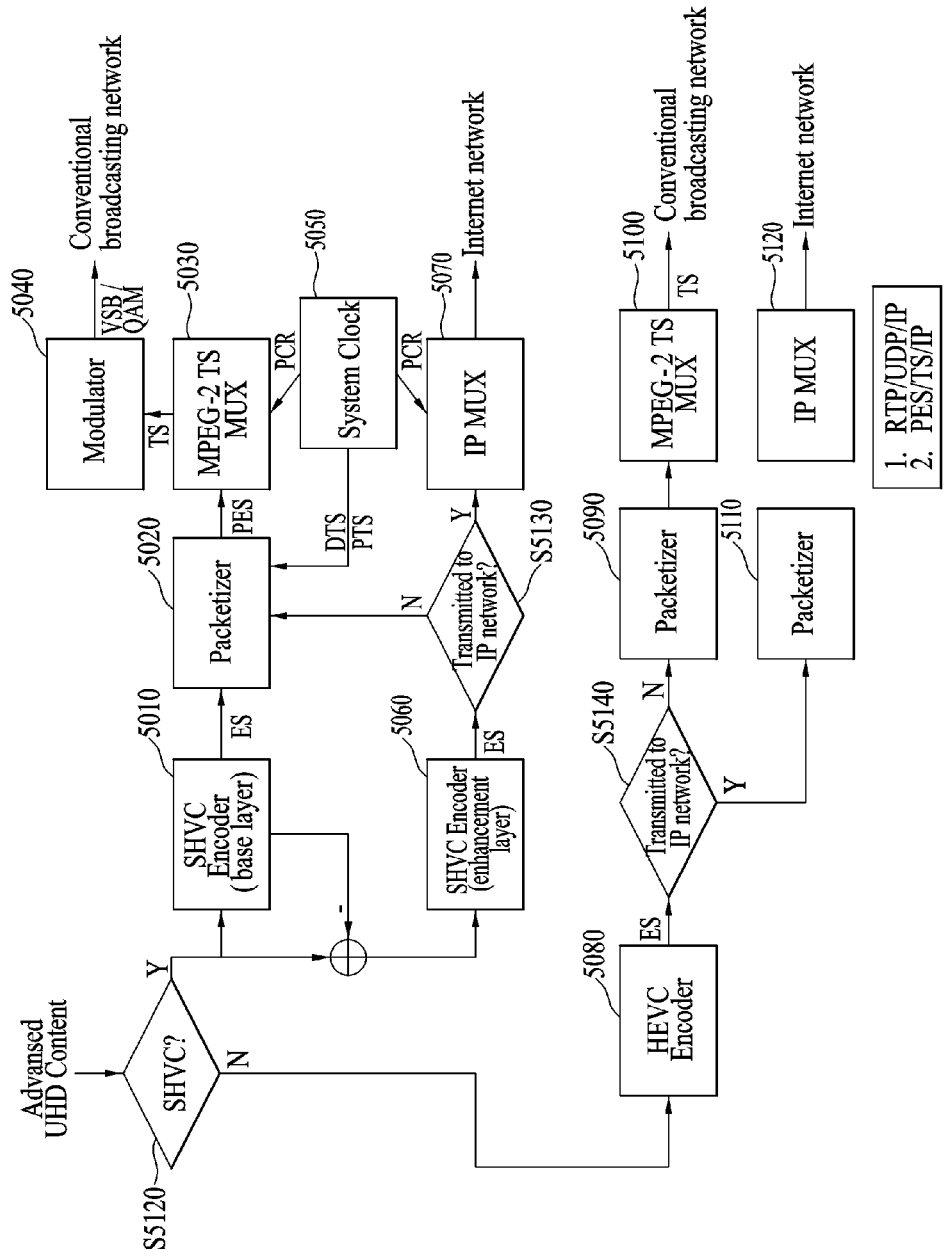
FIG. 5 illustrates a device for transmitting advanced UHD broadcasting content according to an exemplary embodiment of the present invention.

FIG. 5 illustrates a device for transmitting advanced UHD broadcasting content according to an exemplary embodiment of the present invention.

The advanced UHD broadcasting content according to the exemplary embodiment of the present invention may be divided into a base layer and an enhancement layer and then transmitted or may be transmitted as one single stream (S5120). In case the advanced UHD content is layered as a base layer and an enhancement layer and then transmitted, by using the SHVC scheme, the advanced UHD content is layered as the base layer and one or more enhancement layers, and, then, each of the layers may be encoded. Conversely, in case the advanced UHD content is transmitted as a single stream, a video stream of the advanced UHD content may be encoded by using the HEVC scheme, and PSI/SI or PSIP information may be transmitted through the conventional broadcasting network (terrestrial broadcasting network or cable network). The base layer, which is indicated in this drawing, may signify one base layer or may signify a layer including the base layer and one or more enhancement layers. The base layer, which is indicated in this drawing, may signify one enhancement layer or may signify a layer including one or more enhancement layers.

The advanced UHD broadcasting content according to the exemplary embodiment of the present invention may be transmitted only through the IP network or may be divided and transmitted through the convention broadcasting network and the IP network.

A device for transmitting advanced UHD broadcasting content according to an exemplary embodiment of the present invention includes a first SHVC encoder (SHVC Encoder for base layer; 5010), a first packet generator (Packetizer for SHVC; 5020), a first multiplexer (MPEG-2 TS MUX for SHVC; 5030), a Modulator (5040), a System Clock (5050), a second SHVC encoder (SHVC Encoder for enhancement layer; 5060), a first IP multiplexer (IP MUX for SHVC; 5070), HEVC Encoder (5080), a second packet generator (Packetizer for HEVC; 5090), a second multiplexer (MPEG-2 TS MUX for HEVC; 5100), a third packet generator (Packetizer for HEVC through IP; 5110), and/or a second IP multiplexer (IP MUX for HEVC; 5120).

The first SHVC encoder (SHVC Encoder for base layer; 5010) may encode data of the base layer configuring an Essential UHD broadcasting program by using the SHVC scheme. The first SHVC encoder may use encoding schemes other than the SHVC scheme. In addition to the data of the above-described base layer, the first SHVC encoder may encode data of one or more enhancement layers including supplemental information, which is required for providing an Advanced UHD broadcasting program, based upon the data of the above-described base layer. The first SHVC encoder may include a System Encoder (not shown) encoding broadcasting network program metadata (UHD program descriptor) including information on an Advanced UHD broadcasting program, which is being transmitted through the broadcasting network, and/or IP network program metadata (enhancement program descriptor) including information on an Advanced UHD broadcasting program, which is being transmitted through the IP network.

The first packet generator (Packetizer for SHVC; 5020) divides the encoded unit stream (ES; Elementary Steam) to equal sizes and may then generate a PES (Packetized Elementary Stream). The PES may include information on 33 bit of DTS (Decoding Time Stamp) and PTS (Presentation Time Stamp) according to the System Clock (5050). The first packet generator may packetize data that are to be transmitted through the terrestrial broadcasting network or cable network. The first packet generator may packetize data of the encoded base layer and/or data of a first enhancement layer of the one or more enhancement layers to a broadcast packet (or broadcasting packet). Herein, in case a plurality of the above-described enhancement layers exist, the data of the above-described first enhancement layer may signify data of the enhancement layer that is being transmitted through the terrestrial broadcasting network or cable network. Accordingly, instead of signifying only one enhancement layer among a plurality of enhancement layers, the first enhancement layer signifies one enhancement layer of a plurality of enhancement layers, wherein the enhancement layer is transmitted through the broadcasting network, and the first enhancement layer may signify one or more enhancement layers.

The first multiplexer (MPEG-2 TS MUX for SHVC; 5030) may multiplex audio/video PES and private sections, and so on, of PSI/SI, PSIP information and may, then, generate one Transport Stream (TS).

The Modulator (5040) may modulate the generated Transport Stream by using the VSB (Vestigial Side Band) or QAM (Quadrature Amplitude Modulation) scheme and then emit (or send out) the modulated transport stream. Herein, the Modulator may use modulation schemes other than VSB and QAM.

The System Clock (5050) may signify a system reference clock. The System Clock may insert time information of PCR, DTS, PTS, and so on, in the PES and TS. Accordingly, both the stream of the base layer and the stream of the enhancement layer include DTS and PTS information, and, by using this, the streams of both layers may be synchronized. Additionally, a PTS value according to which the synchronization with the stream of the enhancement layer is to be performed may be delivered to the PSI/SI or PSIP, and, then, information associated to this may be created (or generated).

The second SHVC encoder (SHVC Encoder for enhancement layer; 5060) may encode data of one or more enhancement layers including supplemental information, which is required for providing an Advanced UHD broadcasting program, based upon the data of the above-described base layer. The second SHVC encoder may use other encoding schemes other than the SHVC scheme.

The first IP multiplexer (IP MUX for SHVC; 5070) may packetize the TS in an IP format. The first IP multiplexer may add a RTP header, a UDP header, and an IP header to the TS packet and may then generate (or create) an IP packet. The first IP multiplexer may generate a PES by dividing the encoded elementary stream in equal sizes, and, then, by multiplexing the generated audio/video PES with private sections, and so on, of PSI/SI, PSIP information, the first IP multiplexer may generate one Transport Stream (TS), and, by adding an IP header to the generated TS, the first IP multiplexer may generate an IP packet. The first IP multiplexer may packetize data of the second enhancement layer of the one or more encoded enhancement layers to an IP packet. Herein, in case a plurality of the above-described enhancement layers exist, the data of the above-described second enhancement layer may signify data of the enhancement layer being transmitted through the IP network. Accordingly, instead of signifying only one enhancement layer among a plurality of enhancement layers, the second enhancement layer signifies one enhancement layer of a plurality of enhancement layers, wherein the enhancement layer is transmitted through the IP network, and the second enhancement layer may signify one or more enhancement layers.

In case the Advanced UHD broadcasting content is transmitted as a single stream instead of being transmitted after being layered, the HEVC Encoder (5080) may encode the Advanced UHD broadcasting content by using the HEVC scheme. Herein, the above-described HEVC encoder may be replaced with another encoder using another encoding scheme.

The second packet generator (Packetizer for HEVC; 5090) divides the encoded unit stream (ES; Elementary Steam) to equal sizes and may then generate a PES (Packetized Elementary Stream).

The second multiplexer (MPEG-2 TS MUX for HEVC; 5100) may multiplex audio/video PES and private sections, and so on, of PSI/SI, PSIP information and may, then, generate one Transport Stream (TS).

The third packet generator (Packetizer for HEVC through IP; 5110) divides the encoded unit stream (ES; Elementary Steam) to equal sizes and may then generate a PES (Packetized Elementary Stream).

The second IP multiplexer (IP MUX for HEVC; 5120) may packetize the TS in an IP format. The second IP multiplexer may sequentially add a RTP header, a UDP header, and an IP header to the encoded elementary stream (ES) and may then generate (or create) an IP packet. The second IP multiplexer may generate a PES by dividing the encoded elementary stream in equal sizes, and, then, by multiplexing the generated audio/video PES with private sections, and so on, of PSI/SI, PSIP information, the second IP multiplexer may generate one Transport Stream (TS), and, by adding an IP header to the generated TS, the second IP multiplexer may generate an IP packet.

The device for transmitting advanced UHD broadcasting content according to the exemplary embodiment of the present invention may further include a System Information Encoder (not shown). The System Information Encoder may encode PSI/SI or PSIP information, and so on, and may encode broadcasting network program metadata and IP network program metadata, which will be described later on.

Figure 6:
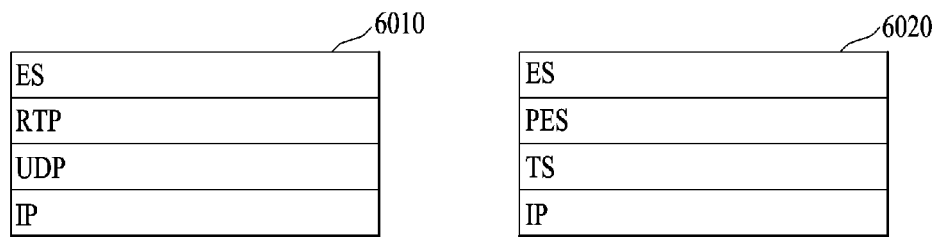
FIG. 6 illustrates a hierarchical structure (or layered structure) of an IP packet according to an exemplary embodiment of the present invention.

FIG. 6 illustrates a hierarchical structure (or layered structure) of an IP packet according to an exemplary embodiment of the present invention.

In case the Advanced UHD broadcasting content according to the exemplary embodiment of the present invention is transmitted through the IP network (Internet network), the Elementary Stream (ES) configuring the Advanced UHD content may be packetized in an IP packet format and, then, may be transmitted to the receiving unit.

Two formats of the layered structure (or hierarchical structure) of the IP packet according to the exemplary embodiment of the present invention may exist. First of all, by sequentially adding a RTP header, a UDP header, and an IP header to the elementary stream configuring the Advanced UHD content, an IP packet may be generated (6010). And, by generating a PES (Packetized Elementary Stream) by dividing the elementary stream configuring the Advanced UHD content to equal sizes, and by generating a Transport Stream (TS) by multiplexing the generated PES and private sections, and so on, of PSI/SI, PSIP information, and by adding the generated TS to the IP header, an IP packet may be generated.

The RTP header signifies a header of the packet, which is generated by a RTP (Real Time Protocol), which refers to a protocol that is used for real time data transport (or delivery). As important components of the RTP header, SSRC (Synchronization Source) and CSRC (Contributing Source) exist. The SSRC (Synchronization Source) performs a function of identifying a source of the RTP stream. The CSRC (Contributing Source) performs a function of identifying sources configuring the media included in the RTP packet.

The UDP header signifies the header of a packet, which is generated by a UDP (User Datagram Protocol), which corresponds to a communication protocol that provides only limited services, when messages are being exchanged between computers within a network using the IP. As important components of the UDP header, a SP (Source Port Number), a DP (Destination Port Number), and a UDP Checksum exist. The SP (Source Port Number) represents a UDP port number of an end transmitting the data, and the DP (Destination Port Number) represents a UDP port number of a destination to which the data are to be transmitted. And, whether or not damage exists in the data that have reached its destination may be verified by the UDP Checksum.

The IP header signifies the header of a packet, which is generated by an IP (Internet Protocol) that is used when data are being transmitted through an Internet network. As important components of the IP header, SIP (Source IP Address) and DIA (Destination IP Address) exist. The SIP (Source IP Address) represents an IP address of the end transmitting the data, and the DIA (Destination IP Address) represents an IP address of the destination to which the data are to be transmitted.

Figure 7:
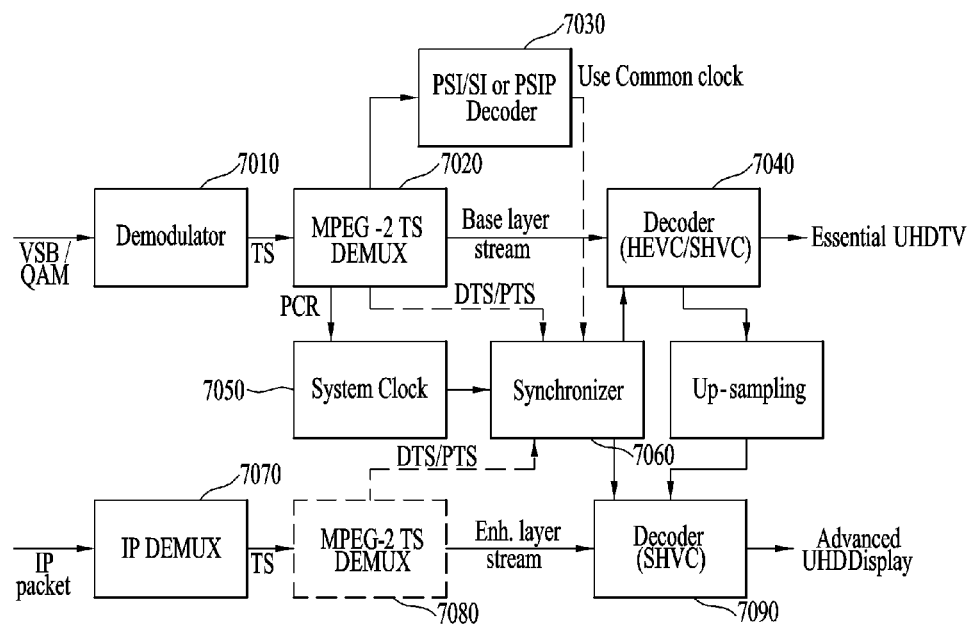
FIG. 7 illustrates a device for receiving advanced UHD broadcasting content, in case the advanced UHD broadcasting content is layered and transmitted through the convention broadcasting network (terrestrial broadcasting network or cable network) and the IP network according to an exemplary embodiment of the present invention.

FIG. 7 illustrates a device for receiving advanced UHD broadcasting content, in case the advanced UHD broadcasting content is layered and transmitted through the convention broadcasting network (terrestrial broadcasting network or cable network) and the IP network according to an exemplary embodiment of the present invention.

The advanced UHD broadcasting content according to the exemplary embodiment of the present invention may be layered as a base layer and one or more enhancement layers and may then be transmitted. In case the advanced UHD broadcasting content is layered as a base layer and one or more enhancement layers and then transmitted through the broadcasting network and the IP network, the device for receiving the advanced UHD broadcasting content according to the exemplary embodiment of the present invention may separately receive the data of each layer through the respective network (broadcasting network or IP network).

The receiving device according to the exemplary embodiment of the present invention may receive data of base layer configuring an Essential UHD broadcasting program and/or data of one or more enhancement layers including supplemental information, which is required for providing an Advanced UHD broadcasting program, based upon the data of the base layer, through a broadcasting network, and the receiving device may receive data of the enhancement layers, among the above-described enhancement layers, that have failed to be received by the receiving data through the IP network. Herein, among the entire enhancement layers, the enhancement layer received through the broadcasting network may be referred to as first enhancement layer, and, among the entire enhancement layers, the enhancement layer received through the IP network may be referred to as second enhancement layer.

The device for receiving the advanced UHD broadcasting content according to the exemplary embodiment of the present invention includes a Demodulator (7010), a first TS demultiplexer (MPEG-2 TS DEMUX; 7020), a System Information Decoder (PSI/SI or PSIP Decoder; 7030), a first decoder (Decoder for HEVC/SHVC; 7040), a System Clock (7050), a Synchronizer (7060), an IP demultiplexer (IP DEMUX; 7070), a second TS demultiplexer (MPEG-2 TS DEMUX for IP; 7080), and/or a second decoder (Decoder for SHVC).

The device for receiving the advanced UHD broadcasting content according to the exemplary embodiment of the present invention may further include a first receiving unit (not shown) and/or a second receiving unit (not shown). The first receiving unit may receive data of the base layer and/or data of the first enhancement layer, which are received through the broadcasting network. Herein, the data of the base layer may refer to data configuring an essential UHD broadcasting program, and the data of the first enhancement layer may refer to data of enhancement layers(s) transmitted through the broadcasting network, among the one or more enhancement layers, and the enhancement layer may refer to a layer including supplemental information, which is required for providing an advanced UHD broadcasting program, based upon the data of the base layer. The first receiving unit may receive broadcasting network program metadata and/or IP network program metadata, which will be described later on. The second receiving unit may receive data of a second enhancement layer being transmitted through the IP network (Internet network). Herein, the data of the second enhancement layer may refer to data of enhancement layer(s) transmitted through the IP network, among the one or more enhancement layers. One or more of the above described first enhancement layers and second enhancement layers may exist. The first receiving unit may be included in the Demodulator (7010), and the second receiving unit may be included in the IP demultiplexer (7070).

The Demodulator (7010) may demodulate the received VSB or QAM signal and may, then, acquire a Transport Stream (TS).

The first TS demultiplexer (MPEG-2 TS DEMUX; 7020) may demultiplex the received TS and may, then, extract audio/video elementary stream, PSI/SI information, PSIP information, PSR, DTC, or PTS. The first TS demultiplexer may refer to a PID (Packet ID) during the process of demultiplexing the TS. Herein, the extract PCR may be used for correcting the System Clock of the receiving device. The DTS, which is delivered to the Synchronizer (7060), may be used as information designating a decoding time in a VDEC buffer (Video Decoder Component buffer), and the PTS, which is delivered to the Synchronizer (7060), may be used as information designating an output time in a Video buffer.

The System Information Decoder (PSI/SI or PSIP Decoder; 7030) may decode information on a stream or service included in the received PSI/SI or PSIP information. The broadcasting network program metadata or IP network program metadata, which will be described later on, may be included in the PSI/SI or PSIP and may be decoded by the System Information Decoder.

The first decoder (Decoder for HEVC/SHVC; 7040) may decode data of the base layer and/or data of the first enhancement layer, which are received by the first receiving unit. The first decoder may decode the stream of the base layer and/or first enhancement layer, which is encoded by using the HEVC or SHVC scheme, to a video image.

The System Clock (7050) may signify a system reference clock. Both the stream of the base layer and the stream of the enhancement layer include DTS and PTS information, and, by using this, the streams of both layers may be synchronized.

The Synchronizer (7060) may synchronize the base layer and the enhancement layer by using the DTS/PTS, which are received from the first TS demultiplexer and the second TS demultiplexer, and by using the corrected PCR, which is received from the System Clock.

The IP demultiplexer (IP DEMUX; 7070) may extract a TS packet from the IP packet, which is received through the Internet network. In case of a system storing the stream in non-real time, a File Format that is suitable for storage may be used instead of the IP packet. In this case, the IP demultiplexer may be replaced with an ISO File Decoder. The IP demultiplexer may deliver timing information, such as DT (Decoding Time) and CT (Continuous Time), and so on, for synchronization and Random Access to the Synchronizer along with a time scale.

The second TS demultiplexer (MPEG-2 TS DEMUX for IP; 7080) may demultiplex the received TS and may, then, extract audio/video elementary stream, DTC or PTS. The DTS, which is delivered to the Synchronizer (7060), may be used as information designating a decoding time in a VDEC buffer (Video Decoder Component buffer), and the PTS, which is delivered to the Synchronizer (7060), may be used as information designating an output time in a Video buffer. In case the advanced UHD broadcasting according to the exemplary embodiment of the present invention is transmitted through the Internet network, there is a case when the content is packetized to PES/TS/IP and then transmitted, and a case when the content is packetized to RTP/UDP/IP and then transmitted may also exist. In case the advanced UHD content is packetized to RTP/UDP/IP and then transmitted, the second TS demultiplexer may be replaced with a RTP/UDP demultiplexer or a RTP/UDP depacketizer.

The second decoder (Decoder for SHVC) may decode data of the second enhancement layer, which is received by the second receiving unit. The second decoder may decode the stream of the second enhancement layer, which is encoded by using the HEVC or SHVC scheme, to a video image. The second decoder may decode the stream of the second enhancement layer by using data of the base layer, which are processed with upscaling (upsampling).

The device for receiving the advanced UHD broadcasting content may further include a playing unit (not shown). The playing unit may signify an Advanced UHD Display, which is shown in this drawing. The playing unit may play (or reproduce) the advanced UHD broadcasting program by using the decoded data of the base layer and decoded data of the one or more enhancement layers. An Advanced UHDTV that can play the Advanced UHD broadcasting content according to the exemplary embodiment of the present invention may play an Advanced UHD broadcasting program, which is provided by the data of the received base layer and the data of all of the received enhancement layers.

FIG. 8 illustrates a device for receiving advanced UI-ID broadcasting content, in case the advanced UHD broadcasting content is transmitted as a single layer stream according to an exemplary embodiment of the present invention.

The device for receiving the advanced UHD broadcasting convent according to the exemplary embodiment of the present invention includes an IP demultiplexer (IP DEMUX; 8010), a TS demultiplexer (MPEG-2 TS DEMUX; 8020), and/or a Decoder (Decoder for HEVC).

The IP demultiplexer (IP DEMUX; 8010) may extract a TS packet from the IP packet, which is received through the Internet network. In case of a system storing the stream in non-real time, a File Format that is suitable for storage may be used instead of the IP packet. In this case, the IP demultiplexer may be replaced with an ISO File Decoder.

The TS demultiplexer (MPEG-2 TS DEMUX; 8020) may demultiplex the TS and may, then, extract audio/video elementary stream, PSI/SI information, or PSIP information. The TS demultiplexer may refer to a PID (Packet ID) during the process of demultiplexing the TS. In case the advanced UHD broadcasting according to the exemplary embodiment of the present invention is transmitted through the Internet network, there is a case when the content is packetized to PES/TS/IP and then transmitted, and a case when the content is packetized to RTP/UDP/IP and then transmitted may also exist. In case the advanced UHD content is packetized to RTP/UDP/IP and then transmitted, the TS demultiplexer may be replaced with a RTP/UDP demultiplexer or a RTP/UDP depacketizer.

The Decoder (Decoder for HEVC) may decode the advanced UHD stream (single stream), which is encoded by using HEVC, may be decoded to a video image. Herein, in case of a single stream that is encoded by using the HEVC encoding scheme, the decoder may perform decoding by using the HEVC scheme.

FIG. 9 illustrates a syntax of a broadcasting network program descriptor (UHD program descriptor) including broadcasting network program metadata, according to an exemplary embodiment of the present invention.

The broadcasting network program descriptor according to the exemplary embodiment of the present invention includes descriptor_tag information, descriptor_length information, and/or broadcasting network program metadata.

The descriptor_tag information identifies this descriptor as a descriptor including descriptor_tag information, descriptor_length information.

The descriptor_length information indicates a length of this descriptor.

The broadcasting network program metadata include program type information (base_layer_program_type), number of layers information (num_layer), layer identification information (layer_ID), layer encoding type information (stream_type), layer elementary stream packet identification information (elementary_PID), scalable type information (scalable_type), layer combination type information (layer_combination_type), combination resolution information (combination_resolution), combination frame rate information (combination_frame_rate), combination bit depth information (combination_bit_depth), combination chroma subsampling information (combination_chroma_subsampling), combination color gamut information (combination_color_gamut), and/or combination High Dynamic Range information (combination_HDR).

The layer program type information (base_layer_program_type) indicates the type of the HD broadcasting program that may be finally provided by the data of the layer being transmitted through the broadcasting network. Herein, the layer being transmitted through the broadcasting network may correspond to a base layer configuring an essential UHD broadcasting program and/or one or more enhancement layers including supplemental information, which is required for providing an advanced UHD broadcasting program based upon the data of the base layer. Detailed description of the layer program type information will be described later on.

The number of layers information (num_layer) indicates the number of layers being transmitted through the broadcasting network. More specifically, this indicates the number of base layer and enhancement layers being transmitted through the broadcasting network. More specifically, the above-described enhancement layer may refer to a first enhancement layer. For example, in case the UHD broadcasting program is configured of base layer, enhancement layer 1, and enhancement layer 2, the value indicated by the number of layers information is equal to 3. Herein, the significance of the above-described enhancement layer 1 is different from that of the above-described first enhancement layer.

The layer identification information (layer_ID) identifies each layer being transmitted through the broadcasting network. More specifically, the layer identification information may indicate an identification number that can identify each layer among the layer being transmitted through the broadcasting network. The layer identification information may perform a function of connecting information on each of the layers being transmitted through the broadcasting network to the respective layer. The layer identification information and IP network layer identification information included in the IP network program metadata, which will be described later on, will not be assigned with the same value.

The layer encoding type information (stream_type) indicates a type of codec that is used in each of the layers being transmitted through the broadcasting network.

The layer elementary stream packet identification information (elementary_PID) indicates packet identification information of an elementary stream including the data of each of the layers being transmitted through the broadcasting network. More specifically, the layer elementary stream packet identification information may signal of a PID (Packet ID) value of an elementary stream corresponding to the layer, which is identified by the layer identification information.

The scalable type information (scalable_type) indicates a scalable item that can be simultaneously provided by each of the layers being transmitted through the broadcasting network. The scalable type information may indicate a scalable item that is simultaneously provided by the layers identified by the layer identification information. The above-described scalable item may include resolution, frame rate, bit depth, chroma subsampling, color gamut, and High Dynamic Range (HDR). Detailed description of the scalable type information will be described later on.

The layer combination type information (layer_combination_type) indicates combination information of the layers being transmitted through the broadcasting network. The layer combination type information indicates the combination of the base layer and/or enhancement layers, which configure the advanced UHD broadcasting program, and which are transmitted through the broadcasting network, wherein the combination is indicated in numbers. Detailed description of the layer combination type information will be described later on.

The combination resolution information (combination_resolution) indicates the resolution that is provided, when the layers being transmitted through the broadcasting network are finally combined in accordance with the layer combination type information. For example, the combination resolution information may indicate 3840*2160.

The combination frame rate information (combination_frame_rate) indicates the frame rate that is provided, when the layers being transmitted through the broadcasting network are finally combined in accordance with the layer combination type information. For example, the combination frame rate information may indicate 120 fps.

The combination bit depth information (combination_bit_depth) indicates the bit depth that is provided, when the layers being transmitted through the broadcasting network are finally combined in accordance with the layer combination type information. For example, the combination bit depth information may indicate 12 bit.

The combination chroma subsampling information (combination_chroma_subsampling) indicates the chroma subsampling information that is provided, when the layers being transmitted through the broadcasting network are finally combined in accordance with the layer combination type information. For example, the combination chroma subsampling information may indicate 4:2:2.

The combination color gamut information (combination_color_gamut) indicates the color gamut information that is provided, when the layers being transmitted through the broadcasting network are finally combined in accordance with the layer combination type information. For example, the combination color gamut information may indicate BT.2020.

The combination High Dynamic Range information (combination_HDR) indicates the High Dynamic Range (HDR) that is provided, when the layers being transmitted through the broadcasting network are finally combined in accordance with the layer combination type information. For example, the combination High Dynamic Range information may indicate conventional luminance capability. Detailed description of the above-described HDR will be described later on.

The broadcasting network program metadata included in the broadcasting network program descriptor according to the exemplary embodiment of the present invention may signal overall configuration information of a UHDTV broadcast that should be provided at a program, channel or service level. The broadcasting network program metadata may include a number of streams configuring the program, information on a channel or service included in each stream, and/or information associated with synchronization for the synchronization of each stream.

The broadcasting network program descriptor according to the exemplary embodiment of the present invention may be included in a program level descriptor of a PMT in the PSI, and the broadcasting network program descriptor may be included in a channel level descriptor of a TVCT/CVCT in the PSIP, and the broadcasting network program descriptor may be included in a service level descriptor of a SDT in the SI. Detailed description of the above-described PMT, PSIP, TVCT/CVCT, and SDT will be described later on.

The broadcasting network program metadata included in the broadcasting network program descriptor according to the exemplary embodiment of the present invention may include information on the advanced UHD broadcasting content, which is transmitted through a network, such as a terrestrial broadcasting network as well as a cable network, IP network, and so on.

Figure 10:
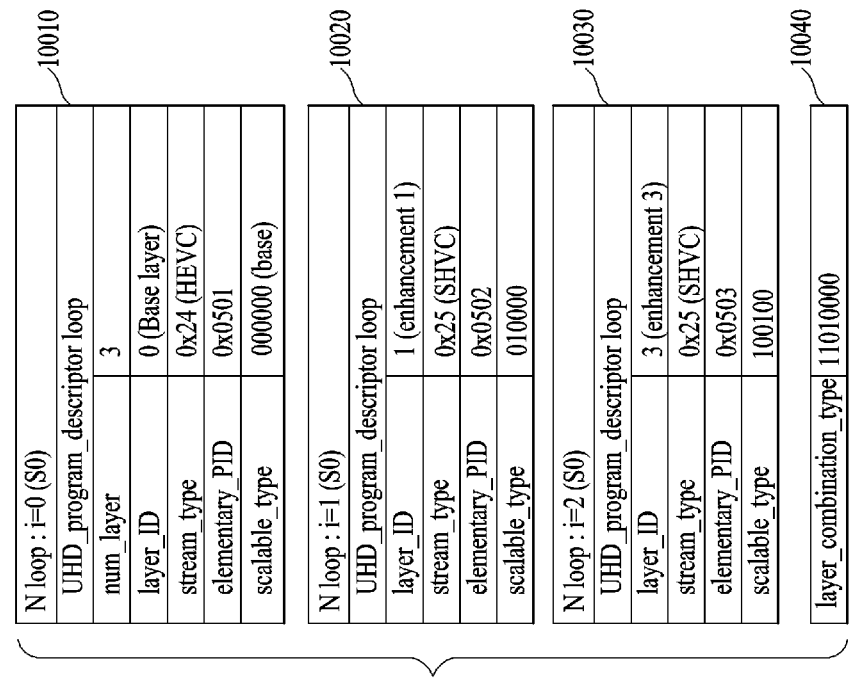
FIG. 10 illustrates information included in the broadcasting network program descriptor, in case the broadcasting network program descriptor (UHD program descriptor) is included in a PMT, according to an exemplary embodiment of the present invention.

FIG. 10 illustrates information included in the broadcasting network program descriptor, in case the broadcasting network program descriptor (UHD program descriptor) is included in a PMT, according to an exemplary embodiment of the present invention.

In this drawing, the information provided by the broadcasting network program metadata included in the broadcasting network program descriptor according to the exemplary embodiment of the present invention is as described below.

In the first right-side box (10010), it is shown that the number of layers information (num_layer) is indicated as 3, and this indicates that the number of layers being transmitted through the broadcasting network is equal to 3. The layer identification information (layer_ID) indicates a value of 0, which indicates that the corresponding layer is a base layer. The layer encoding type information (stream_type) indicates a value of 0x24, which indicates that the codec used in the base layer corresponds to HEVC. The layer elementary stream packet identification information (elementary_PID) indicates a value of 0x0501, which indicates that the PID of the elementary stream including the data of the base layer is equal to 0x0501. The scalable type information (scalable_type) indicates a value of 000000, which indicates that there is no scalable item that can be simultaneously provided by the base layer. Detailed description of the scalable type information will be described later on. The value indicated by the above-described layer encoding type information (stream_type) corresponds to a value identifying a stream that is encoded by using the HEVC scheme, which may indicate a value of 0x24 or 0x25.

In the second right-side box (10020), it is shown that the layer identification information (layer_ID) indicates a value of 1, which indicates that the corresponding layer is enhancement layer 1. The layer encoding type information (stream_type) indicates a value of 0x27, which indicates that the codec used in the enhancement layer 1 corresponds to SHVC. The layer elementary stream packet identification information (elementary_PID) indicates a value of 0x0502, which indicates that the PID of the elementary stream including the data corresponding to the enhancement layer 1 is equal to 0x0502. The scalable type information (scalable_type) indicates a value of 010000, which indicates that the scalable item that can be simultaneously provided by the enhancement layer 1 corresponds to the frame rate. Detailed description of the scalable type information will be described later on. The value indicated by the above-described layer encoding type information (stream_type) corresponds to a value identifying an enhancement layer stream, in case the codec of the SHVC scheme is used, which may indicate a value of 0x27, 0x28, 0x29, or 0x2A.

In the third right-side box (10030), it is shown that the layer identification information (layer_ID) indicates a value of 3, which indicates that the corresponding layer is enhancement layer 3. The layer encoding type information (stream_type) indicates a value of 0x27, which indicates that the codec used in the enhancement layer 3 corresponds to SHVC. The layer elementary stream packet identification information (elementary_PID) indicates a value of 0x0503, which indicates that the PID of the elementary stream including the data corresponding to the enhancement layer 3 is equal to 0x0503. The scalable type information (scalable_type) indicates a value of 100100, which indicates that the scalable items that can be simultaneously provided by the enhancement layer 3 correspond to the resolution and chroma subsampling. Detailed description of the scalable type information will be described later on. The value indicated by the above-described layer encoding type information (stream_type) corresponds to a value identifying an enhancement layer stream, in case the codec of the SHVC scheme is used, which may indicate a value of 0x27, 0x28, 0x29, or 0x2A.

In the fourth right-side box (10040), it is shown that the layer combination type information (layer_combination_type) indicates a value of 11010000, which indicates that the UHD broadcasting program that is identified by the layer program type information is provided by a combination of the base layer, enhancement layer 1, and enhancement layer 3. Detailed description of the layer combination type information (layer_combination_type) will be described later on.

In this drawing, the left-side drawing corresponds to a drawing showing a syntax of a PMT (Program Map Table), wherein the broadcasting network program metadata and IP network program metadata according to the exemplary embodiment of the present invention may be included in a descriptor( ) part of the PMT. Detailed description of the PMT will be described later on.

Figure 11:
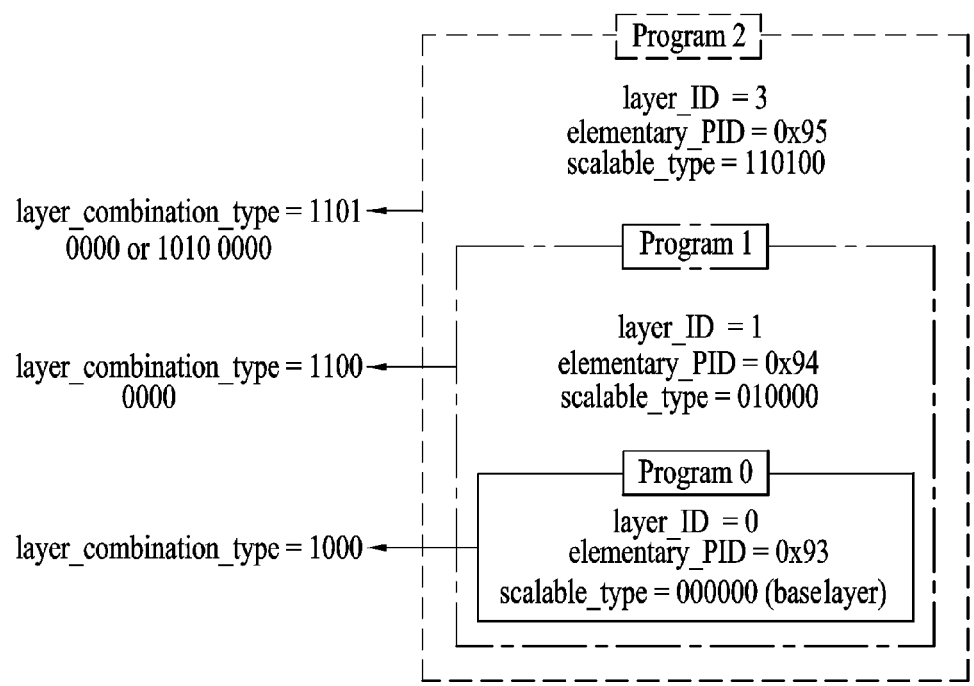
FIG. 11 illustrates a relationship between a layer combination and a number of broadcasting programs being provided by the layer combination according to an exemplary embodiment of the present invention.

FIG. 11 illustrates a relationship between a layer combination and a number of broadcasting programs being provided by the layer combination according to an exemplary embodiment of the present invention.

In case the value indicated by the layer combination type information according to the exemplary embodiment of the present invention is equal to 1000 0000, the layer combination type information may indicate Program 0, which is provided by one base layer (layer_ID=0). In case the value indicated by the layer combination type information is equal to 1100 0000, the layer combination type information may indicate Program 1, which is provided by a combination of a base layer (layer_ID=0) and an enhancement layer 1 (layer_ID=1). In case the value indicated by the layer combination type information is equal to 1101 0000 or 1010 0000, the layer combination type information may indicate Program 2, which is provided by a combination of a base layer (layer_ID=0), an enhancement layer 1 (layer_ID=1), and an enhancement layer 3 (layer_ID=3), or which is provided by a combination of a base layer (layer_ID=0) and an enhancement layer 3 (layer_ID=3).

Apart from a case when the broadcasting network program descriptor (UHD program descriptor) according to the exemplary embodiment of the present invention includes a number of layer combination information (num_layer_combination), which will be described later on, and when the layer combination type information is described below the above-described number of layer combination information, one broadcasting program that is indicated by the layer combination type information may be provided by one layer combination.

FIG. 12 illustrates a UHD broadcasting program type indicated by layer program type information (base_layer_program_type) according to an exemplary embodiment of the present invention.

The layer program type information (base_layer_program_type) according to the exemplary embodiment of the present invention may also be referred to as UHD program type information (UHD_program_type).

Referring to this drawing, in case the value of the layer program type information according to the exemplary embodiment of the present invention is equal to 0000, the UHD broadcasting program that may be finally provided by a layer, which is transmitted through the broadcasting network, may indicate a UHD-A program having a resolution of 3840*2160, having a frame rate of 30 fps, having a bit depth of 8 bit, having a chroma subsampling of 4:2:0, having a color gamut of BT.709, and having a high dynamic range of conventional HDR. In case the value of the layer program type information is equal to 0001, the UHD broadcasting program that may be finally provided by a layer, which is transmitted through the broadcasting network, may indicate a UHD-B program having a resolution of 3840*2160, having a frame rate of 60 fps, having a bit depth of 8 bit, having a chroma subsampling of 4:2:0, having a color gamut of BT.709, and having a high dynamic range of conventional HDR. In case the value of the layer program type information is equal to 0010, the UHD broadcasting program that may be finally provided by a layer, which is transmitted through the broadcasting network, may indicate a UHD-C program having a resolution of 3840*2160, having a frame rate of 60 fps, having a bit depth of 10 bit, having a chroma subsampling of 4:2:0, having a color gamut of BT.709, and having a high dynamic range of conventional HDR. In case the value of the layer program type information is equal to 0011, the UHD broadcasting program that may be finally provided by a layer, which is transmitted through the broadcasting network, may indicate a UHD-A program having a resolution of 3840*2160, having a frame rate of 120 fps, having a bit depth of 10 bit, having a chroma subsampling of 4:2:0, having a color gamut of BT.709, and having a high dynamic range of conventional HDR. The values of 0100-0111 are currently reserved values, which may be used as values indicating other UHD broadcasting program types in future usages.

The layer program type information according to yet another exemplary embodiment of the present invention may also be categorized by a combination other than the combination of resolution, frame rate, bit depth, chroma subsampling, color gamut, and HDR.

Instead of being transmitted as a group, such as providing a combination of resolution, frame rate, bit depth, chroma subsampling, color gamut, and HDR, the layer program type information according to yet another exemplary embodiment of the present invention may separately provide each of the items, and may also provide a group of selected items.

The UHD broadcasting program according to the exemplary embodiment of the present invention may include an Essential UHD broadcasting program, which is provided by the base layer, and an Advanced UHD broadcasting program, which is provided by the base layer and/or one or more enhancement layers.

FIG. 13 illustrates scalable type information (scalable_type) according to an exemplary embodiment of the present invention.

The scalable type information according to the exemplary embodiment of the present invention indicates scalable items that can be simultaneously provided by one layer.

For example, in case scalable video coding is provided by any one enhancement layer, which is transmitted through the broadcasting network according to the exemplary embodiment of the present invention, with respect to bit-depth and frame rate, as shown in this drawing, the scalable type information may indicate a value of 011000.

The scalable items according to the exemplary embodiment of the present invention may include items other than resolution, frame rate, bit depth, chroma subsampling, color gamut, and High Dynamic Range (HDR), and, among the above-described items, specific items may be excluded.

By providing the scalable items according to the exemplary embodiment of the present invention by using the type information, the transmitting end may simultaneously provide information on multiple scalable items.

FIG. 14 illustrates layer combination type information (layer_combination_type) according to an exemplary embodiment of the present invention.

The layer combination type information according to the exemplary embodiment of the present invention indicates a combination of the layers being transmitted through the broadcasting network. For example, in case of a UHD broadcasting program including the base layer and enhancement layer 2, the layer combination type information may indicate a value of 10100000.

The layer combination type information according to the exemplary embodiment of the present invention will not be assigned with the same value as the IP network layer identification information included in the IP network program metadata, which will be described later on. More specifically, the values indicated by each of the layer combination type information and the IP network layer identification information may be allocated so that the values are not identical to one another.

Referring to this drawing, if one base layer and three enhancement layers are included in the layer being transmitted through the broadcasting network, and if a combination of one base layer and three enhancement layers is signaled by the broadcasting network program descriptor (UHD program descriptor) including the above-described broadcasting network program metadata, an IP network program descriptor (enhancement program descriptor) including the IP network program metadata, which will be described later on, may perform signaling on the remaining 4 bits. For example, in this drawing, if the value indicated by the layer combination type information is equal to 10100000, the last 0000 may be signaled by the IP network combination type information, which will be described later on.

FIG. 15 illustrates a syntax of a broadcasting network program descriptor (UHD program descriptor) including broadcasting network program metadata having number of layer combinations information (num_layer_combination) added thereto according to an exemplary embodiment of the present invention.

The broadcasting network program descriptor according to another exemplary embodiment of the present invention includes the information that may be included in the broadcasting network program descriptor, which is described before this drawing, and/or number of layer combination information (num_layer_combination).

Among the information included in this drawing, detailed description on information having the same name as the information that may be included in the broadcasting network program descriptor, which is described before this drawing, will be replaced by the detailed description on the information that may be included in the above-described broadcasting network program descriptor.

The number of layer combination information (num_layer_combination) indicates a number of layer combinations being transmitted through the broadcasting network. More specifically, this indicates a number of the layer combination type information (layer_combination_type).

According to the exemplary embodiment of the present invention, combination resolution information (combination_resolution), combination frame rate information (combination_frame_rate), combination bit depth information (combination_bit_depth), combination chroma subsampling information (combination_chroma_subsampling), combination color gamut information (combination_color_gamut), and/or combination High Dynamic Range information (combination_HDR) may be included in a repetitive statement (of FOR statement) of the number of layer combination information.

Figure 16:
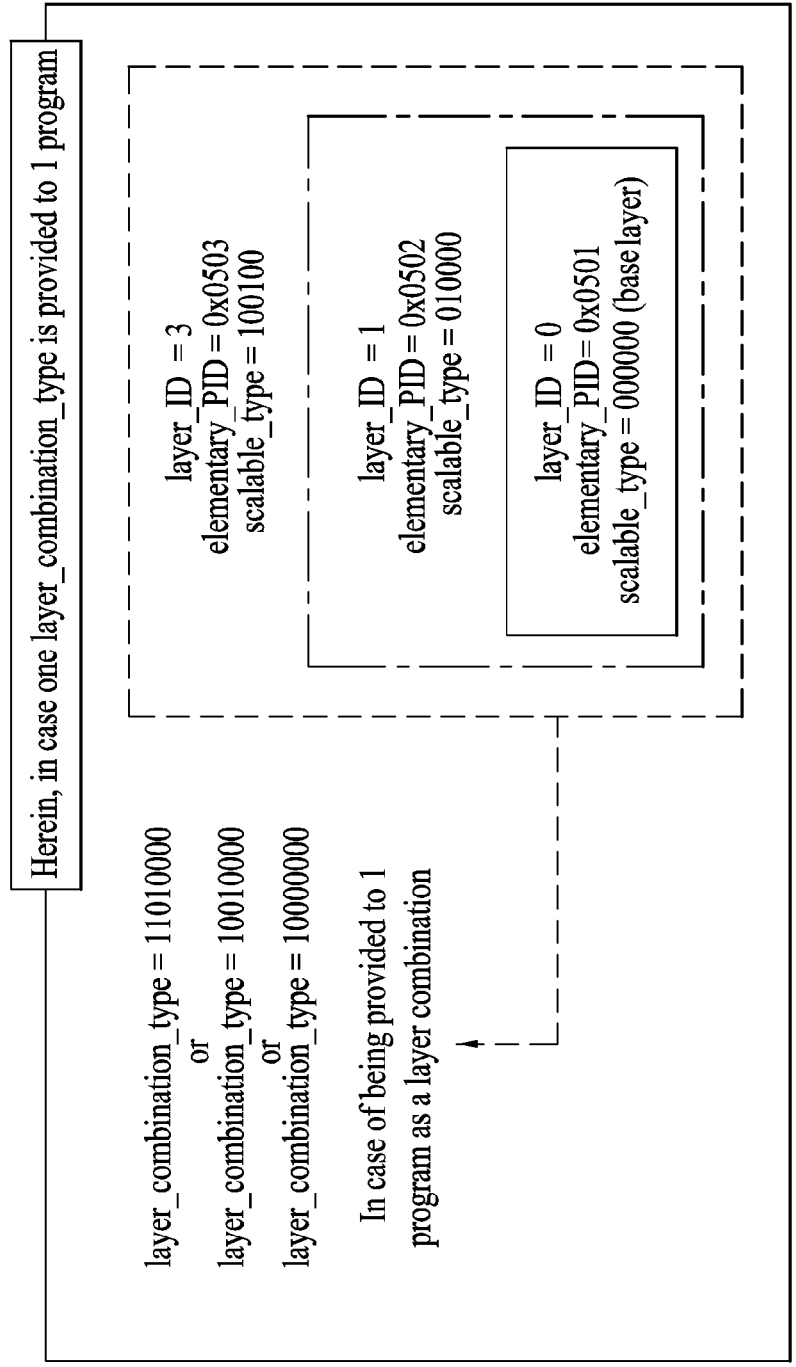
FIG. 16 illustrates a relationship between a layer combination and a number of broadcasting programs being provided by the layer combination according to another exemplary embodiment of the present invention.

FIG. 16 illustrates a relationship between a layer combination and a number of broadcasting programs being provided by the layer combination according to another exemplary embodiment of the present invention.

Referring to this drawing, the layer that is being transmitted through the broadcasting network includes a base layer (layer_ID=0), an enhancement layer 1 (layer_ID=1), and an enhancement layer 3 (layer_ID=3). Layer combination type information (layer_combination_type) having the values of 11010000, 10010000, and 10000000 may be generated by the combination configured of the three layers included in the layer being transmitted through the broadcasting network.

In case above-described broadcast network program descriptor according to the exemplary embodiment of the present invention includes the number of layer combination information (num_layer_combination), and in case the layer combination type information (layer_combination_type) is included in the repetitive statement of the number of layer combination information, among the above-described three different types of layer combination type information, which may be generated in this drawing, one layer combination type information may be provided to one broadcasting program.

FIG. 17 illustrates a syntax of an IP network program descriptor (enhancement program descriptor) including IP network program metadata according to an exemplary embodiment of the present invention.

The IP network program descriptor according to the exemplary embodiment of the present invention includes descriptor_tag information, descriptor_length information, and/or IP network program metadata.

The descriptor_tag information identifies this descriptor as a descriptor including descriptor_tag information, descriptor_length information.

The descriptor_length information indicates a length of this descriptor.

The IP network program metadata include Is scalable flag information (is_scalable_flag), Is IP service on information (is_IP_service_on), UHD program resolution information (UHD_resolution), UHD program frame rate information (UHD_frame_rate), UHD program bit depth information (UHD_bit_depth), UHD program chroma subsampling information (UHD_chroma_subsampling), UHD program color gamut information (UHD_color_gamut), UHD program High Dynamic Range information (UHD_HDR), Internet linkage (or connection) information (ip_linkage_info), channel linkage information (channel_linkage_info), number of IP network layers information (num_layer), IP network layer identification information (layer_ID), IP network layer elementary stream packet identification information (elementary_PID), layer path information (layer_path), service type information (service_type), IP network number of layer combination information (num_layer_combination), IP network layer combination type information (layer_combination_type), IP network layer combination resolution information (combination_resolution), IP network layer combination frame rate information (combination_frame_rate), IP network layer combination bit depth information (combination_bit_depth), IP network layer combination chroma subsampling information (combination_chroma_subsampling), IP network layer combination color gamut information (combination_color_gamut), and/or IP network layer combination High Dynamic Range information (combination_HDR).

The Is scalable flag information (is_scalable_flag) indicates whether or not the data of the layer being transmitted through the IP network is encoded by a scalable codec. If the value indicating the Is scalable flag information is equal to 1, this indicates that a stream encoded by a scalable video coding scheme is transmitted.

The Is IP service on information (is_IP_service_on), in case a UHD service is provided through an Internet network, the Is IP service on information may indicate a value of 1.

The UHD program resolution information (UHD_resolution) indicates a resolution of an advanced UHD broadcasting program, in case the advanced broadcasting program is provided by a single stream. Resolution information and frame rate information may be replaced with level information.

The UHD program frame rate information (UHD_frame_rate) indicates a frame rate of an advanced UHD broadcasting program, in case the advanced broadcasting program is provided by a single stream. Resolution information and frame rate information may be replaced with level information.

The UHD program bit depth information (UHD_bit_depth) indicates a bit depth of an advanced UHD broadcasting program, in case the advanced broadcasting program is provided by a single stream.

The UHD program chroma subsampling information (UHD_chroma_subsampling) indicates a chroma subsampling of an advanced UHD broadcasting program, in case the advanced broadcasting program is provided by a single stream.

The UHD program color gamut information (UHD_color_gamut) indicates a color gamut of an advanced UHD broadcasting program, in case the advanced broadcasting program is provided by a single stream. The color gamut may be categorized as BT.709, partial BT.2020, BT.2020, DCI-P3, and so on.

The UHD program High Dynamic Range information (UHD_HDR) indicates a High Dynamic Range of an advanced UHD broadcasting program, in case the advanced broadcasting program is provided by a single stream.

The Internet linkage (or connection) information (ip_linkage_info) indicates information on a transmission path of data corresponding to each layer being transmitted through the IP network. In case the Advanced UHD broadcasting program is transmitted in a single stream, the Internet linkage information (or IP linkage information) may indicate information on its transmission path. In case of transmitting UHD data or enhancement data that may configure UHD, the IP linkage information may indicate information on the above-described UHD data or enhancement data that may configure UHD. Detailed description of the IP linkage information will be described later on.

The channel linkage information (channel_linkage_info) indicates information on another transmission path, in case the data configuring the UHD content are not transmitted through the Internet network. The channel linkage information indicates information on another transmission path other than the Internet network, even in case the advanced UHD broadcasting program is transmitted in a single stream. In case of transmitting UHD data or enhancement data that may configure UHD through a transmission path other than the Internet network, the channel linkage information may indicate information on the above-described UHD data or enhancement data that may configure UHD. According to the exemplary embodiment of the present invention, the channel linkage information may include _type information, operator ID information, _ID information, service_number information, transport_stream_ information, and/or source_id information. The _type information may indicate a network type, such as cable, satellite, terrestrial, and so on. The operator ID information may indicate operator identification information. The _ID information network identification information. The service_number information may be replaced with channel identification information, a major channel number or a minor channel number. The transport_stream_id information may indicate identification information of a transport stream. The source_id information may indicate source identification information of a source from which data are transmitted.

The number of IP network layers information (num_layer) indicates the number of layers being transmitted through the IP network, in case the data of the layer being transmitted from the IP network are encoded by a scalable codec.

The IP network layer identification information (layer_ID) may identify each of the layers being transmitted through the IP network, in case the data of the layer being transmitted from the IP network are encoded by a scalable codec. The IP network layer identification information may be assigned with a value that is not identical to the value assigned to the layer identification information included in the above-described broadcasting network program metadata. More specifically, if values 0, 1, 2, and 3 are assigned to the layer identification information included in the above-described broadcasting network program metadata, values of 4, 5, 6, and 7 may be assigned to the IP network layer identification information included in the IP network program metadata.

The IP network layer elementary stream packet identification information (elementary_PID) indicates packet identification information of an elementary stream including the data of each of the layers being transmitted through the IP network. More specifically, the IP network layer elementary stream packet identification information may signal of a PID (Packet ID) value of an elementary stream corresponding to the layer, which is identified by the IP network layer identification information.

The layer path information (layer_path) may indicate through which path each layer is transmitted. For example, detailed description of the layer path information will be described later on.

The service type information (service_type) indicates a scalable item that can be simultaneously provided by each of the layers being transmitted through the IP network. This may indicate the same scalable type information (scalable_type) as the scalable type information included in the above-described broadcasting network program metadata. For example, in case of providing scalable video coding respective to bit-depth and frame rate from any one of the enhancement layers being transmitted through the IP network according to the exemplary embodiment of the present invention, the scalable type information may indicate a value of 011000. Additionally, according to the exemplary embodiment of the present invention, the scalable items may include items other than resolution, frame rate, bit depth, chroma subsampling, color gamut, and High Dynamic Range (HDR), and, among the above-described items, specific items may be excluded. By providing the scalable items according to the exemplary embodiment of the present invention by using the type information, the transmitting end may simultaneously provide information on multiple scalable items.

The IP network number of layer combination information (num_layer_combination) may indicate a number of layer combinations that may be provided by the advanced UHD broadcasting program, in case the data of the layer being transmitted from the IP network are encoded by a scalable codec. The IP network number of layer combination information indicates a number of layer combinations transmitted through the IP network.

The IP network layer combination type information (layer_combination_type) indicates combination information of layers being transmitted through the IP network, in case the data of the layer being transmitted from the IP network are encoded by a scalable codec. The value being assigned to the IP network layer combination type information may be assigned with values that are not identical to the values being assigned to the layer combination type information included in the above-described broadcasting network program metadata. More specifically, if 4 bits are assigned to the layer combination type information included in the above-described broadcasting network program metadata, the remaining 4 bits may be assigned to the IP network layer combination type information included in the IP network program metadata. In other words, in the above-described broadcasting network program metadata, if 4 bits are assigned to the layer combination type information in order to signal the layer being transmitted through a terrestrial broadcasting network or a cable network (RF or cable), the remaining 4 bits may be assigned to the IP network layer combination type information indicating the combination information of the enhancement layer being transmitted through the Internet network.

The IP network layer combination resolution information (combination_resolution) indicates a resolution of a program provided by layers, which are combined in accordance with the IP network layer combination type information.

The IP network layer combination frame rate information (combination_frame_rate) indicates a frame rate of a program provided by layers, which are combined in accordance with the IP network layer combination type information.

The IP network layer combination bit depth information (combination_bit_depth) indicates a bit depth of a program provided by layers, which are combined in accordance with the IP network layer combination type information.

The IP network layer combination chroma subsampling information (combination_chroma_subsampling) indicates a chroma subsampling of a program provided by layers, which are combined in accordance with the IP network layer combination type information.

The IP network layer combination color gamut information (combination_color_gamut) indicates a color gamut of a program provided by layers, which are combined in accordance with the IP network layer combination type information.

The IP network layer combination High Dynamic Range information (combination_HDR) indicates a High Dynamic Range of a program provided by layers, which are combined in accordance with the IP network layer combination type information.

In case a stream of the enhancement layer is transmitted or an entire program is transmitted through the Internet network, the IP network program metadata included in the IP network program descriptor may signal configuration information of the broadcasting program. The IP network program metadata may also perform additional signaling on the information of the Internet network.

The IP network program descriptor according to the exemplary embodiment of the present invention may be included in a program level descriptor of a PMT in the PSI, and the IP network program descriptor may be included in a channel level descriptor of a TVCT/CVCT in the PSIP, and the IP network program descriptor may be included in a service level descriptor of a SDT in the SI. Detailed description of the above-described PMT, PSIP, TVCT/CVCT, and SDT will be described later on.

The IP network program metadata included in the IP network program descriptor according to the exemplary embodiment of the present invention may include information on the advanced UHD broadcasting content, which is transmitted through a network, such as an IP network as well as a terrestrial network, a cable network, and so on.

FIG. 18 illustrates a significance respective to a value indicated by layer path information (layer_path) according to an exemplary embodiment of the present invention.

In case the value indicated by the layer path information according to the exemplary embodiment of the present invention is equal to 01, this indicates that the corresponding layer is being serviced by the same channel as the current broadcasting network, and, when the value is equal to 10, this indicates that the corresponding layer is being serviced by a channel that is different from the current broadcasting network, and, when the value is equal to 11, this indicates that the corresponding layer is being serviced through an IP network.

In case the value indicated by the layer path information according to the exemplary embodiment of the present invention is equal to 01, a PID of the TS may be included. In case the value indicated by the layer path information is equal to 10, _type information, operator identification number (operator ID), network identification number (_id), service_number, channel identification number (major channel number or minor channel number), transport_stream_id, and/or source_id information of cable or satellite, and so on, may be included. In case the value indicated by the layer path information is equal to 11, IP address and/or UDP port number information may be included.

Figure 19:
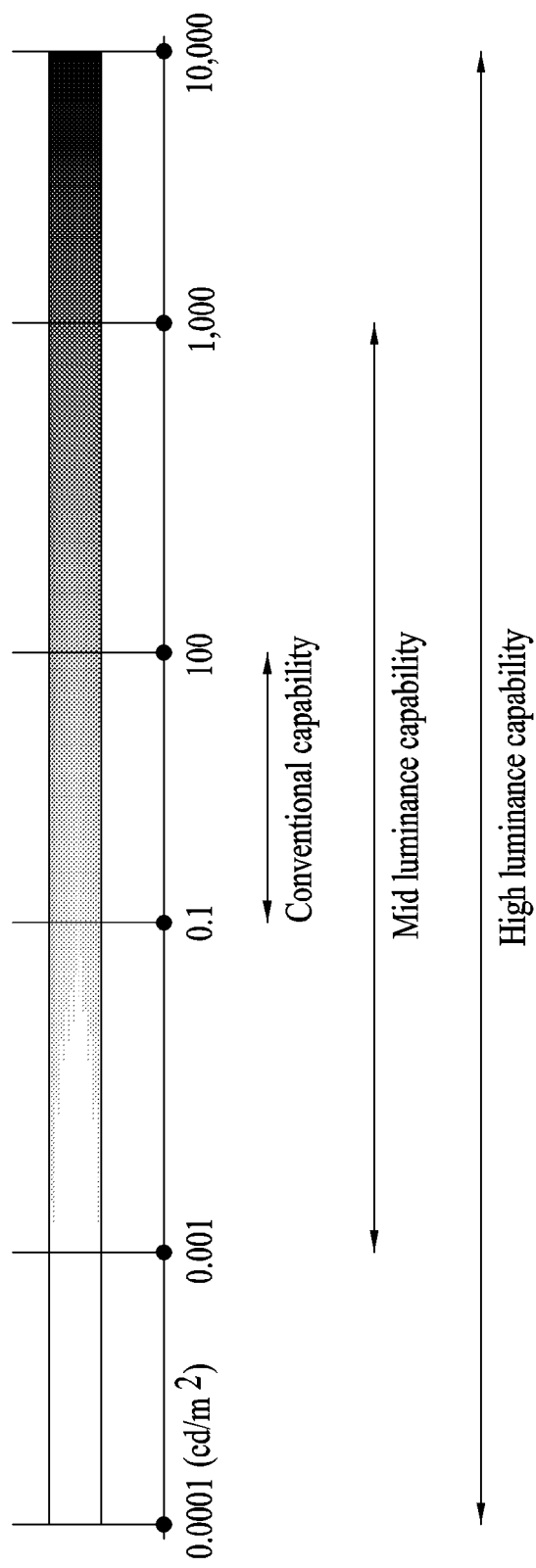
FIG. 19 illustrates a High Dynamic Range according to an exemplary embodiment of the present invention.

FIG. 19 illustrates a High Dynamic Range according to an exemplary embodiment of the present invention.

As shown in this drawing, the HDR according to the exemplary embodiment of the present invention may be divided into conventional capability, mid luminance capability, and high luminance capability. Accordingly, the combination High Dynamic Range (HDR) information (combination_HDR) included in the broadcasting network program metadata, the IP network layer combination High Dynamic Range (HDR) information (combination_HDR) included in the IP network program metadata, or the UHD program High Dynamic Range (HDR) information (UHD_HDR) according to the exemplary embodiment of the present invention may indicate any one of the HDRs, among the above-described conventional capability, mid luminance capability, and high luminance capability.

According to the exemplary embodiment of the present invention, apart from the above-described HDR range, by designating arbitrary minimum value and maximum value (cd/m2), the combination High Dynamic Range (HDR) information, the IP network layer combination High Dynamic Range (HDR) information, and/or the UHD program High Dynamic Range (HDR) information may be signaled.

FIG. 20 illustrates a syntax of internet connection (or linkage) information (ip_linkage_info) according to an exemplary embodiment of the present invention.

The internet linkage information (or IP linkage information) according to the exemplary embodiment of the present invention includes descriptor_tag information, descriptor_length information, IP address type information (IP_address_type), IP address information (IPv4_address), port number information (port_number), URI length information (EL_URI_length), and/or URI information (EL_URI-byte).

The descriptor_tag information identifies this descriptor as a descriptor including the IP linkage information.

The descriptor_length information indicates a length of this descriptor.

The IP address type information (IP_address_type) indicates an IP address type that may receive the data of each layer being transmitted through the IP network. Detailed description on the IP address type information will be described later on.

The IP address information (IPv4_address) indicates an IP address type respective to the IP address type information (IP_address_type). The IP address information indicates a network address value for performing routing, and, by assigning bits in accordance with the type, the IP address may be signaled. The IP address information may indicate an address respective to an IPv4 type or an address respective to an IPv6 type.

The port number information (port_number) indicates a UDP port number that may receive the data of each layer being transmitted through the IP network.

The URI length information (EL_URI_length) may indicate a URI length respective to a file that is to be streamed, in case a streaming service is provided.

The URI information (EL_URI-byte) may indicate a URI respective to a file that is to be streamed, in case a streaming service is provided.

FIG. 21 illustrates IP address type information (IP_address_type) according to an exemplary embodiment of the present invention.

The IP address type information according to the exemplary embodiment of the present invention may distinguish whether the IP address corresponds to IPv4, which is configured of 32 bits, or whether the IP address corresponds to IPv6, which is configured of 128 bits.

Referring to this drawing, if the IP address type information is equal to 00, this may indicate IPv4, and if the IP address type information is equal to 01, this may indicate IPv6.

FIG. 22 illustrates a syntax of a PMT (Program Map Table) according to an exemplary embodiment of the present invention.

The broadcasting network program descriptor and/or IP network program metadata according to the exemplary embodiment of the present invention may be included in a program level descriptor of the PMT according to the exemplary embodiment of the present invention.

The PMT according to the exemplary embodiment includes a table_id field, a section_syntax_indicator field, a section_length field, a program_number field, a version_number field, a current_next_indicator field, a section_number field, a last_section_number field, a PCR_PID field, a program_info_length field, a descriptor( ), a stream_type field, an elementary_PID field, an ES_info_length field, a descriptor( ), and/or a CRC_32 field.

The table_id field identifies a table type. The table_id field may perform a function indicating that this table section corresponds to a section configuring the PMT.

The section_syntax_indicator field indicates a format of a table section following this field. If the value of this field is equal to 0, this indicates that this table section corresponds to a short format. If the value of this field is equal to 1, this table section follows the general long format.

The section_length field indicates a length of this table section. Since the section_length field indicates a length starting from after this field to the end of this table section, the actual length of this table section may be equal to a value of adding 3 bytes to the value indicated by the sercion_length field.

The program_number field identifies each program service or virtual channel existing within the transport stream.

The version_number field indicates a version number of a private table section. The receiver may use this field and the current_next_indicator field, which will be described later on, so as to locate a most recent table section, among the table section stored in the memory.

If the value indicated by the current_next_indicator field is equal to 1, this indicates that the table that is currently being transmitted is valid, and if the value is equal to 0, this indicates that the table that is currently being transmitted is not currently valid but shall become valid in the future.

The section_number field indicates the indexed order of this section within this table.

The last_section_number field indicates the turn of a last section among the sections configuring this table.

The PCR_PID field indicates a packet ID having a PCR (Program Clock Reference) for a program service existing therein.

The program_info_length field indicates a length of the descriptor indicating program information (program_info) that follows hereinafter.

The descriptor( ) refers to a descriptor indicating information on a program corresponding to this table section. The broadcasting network program descriptor and/or IP network program descriptor according to the exemplary embodiment of the present invention may correspond to the above-described descriptor( ).

The stream_type field indicates a type of each elementary stream configuring the program, which is described by this table.

The elementary_PID field indicates a packet ID of each elementary stream configuring the program, which is described by this table.

The ES_info_length field indicates a length of the descriptor indicating information on each elementary stream (ES_info) that follows hereinafter.

The descriptor( ) refers to a descriptor indicating information on one elementary stream among the elementary streams configuring the program, which is described by this table.

The CRC_32 field indicates a CRC value that is used for verifying whether or not an error exists in the data included in this table section.

FIG. 23 illustrates a syntax of a SDT (Service Description Table) according to an exemplary embodiment of the present invention.

The broadcasting network program descriptor and/or IP network program metadata according to the exemplary embodiment of the present invention may be included in a service level descriptor of the SDT according to the exemplary embodiment of the present invention.

The SDT according to the exemplary embodiment of the present invention includes a table_id field, a section_syntax_indicator field, a section_length field, a transport_stream_id field, a version_number field, a current_next_indicator field, a section_number field, a last_section_number field, an original__id field, a service_id field, an EIT_schedule_flag field, an EIT_present_following_flag field, a running_status field, a free_CA_mode field, a descriptors_loop_length field, a descriptor( ), and/or a CRC_32 field.

The table_id field identifies a table type. The table_id field may perform a function indicating that this table section corresponds to a section configuring the SDT.

The section_syntax_indicator field indicates a format of a table section following this field. If the value of this field is equal to 0, this indicates that this table section corresponds to a short format. If the value of this field is equal to 1, this table section follows the general long format.

The section_length field indicates a length of this table section. The section_length field may indicate a length starting from after this field to the end of this table section.

The transport_stream_id field identifies a transport stream (TS) that is intended to be described in this table.

The version_number field indicates a version number of a private table section. The receiver may use this field and the current_next_indicator field, which will be described later on, so as to locate a most recent table section, among the table section stored in the memory.

If the value indicated by the current_next_indicator field is equal to 1, this indicates that the table that is currently being transmitted is valid, and if the value is equal to 0, this indicates that the table that is currently being transmitted is not currently valid but shall become valid in the future.

The section_number field indicates the indexed order of this section within this table.

The last_section_number field indicates the turn of a last section among the sections configuring this table.

The original__id field may identify a first (or original) broadcasting station that has transmitted the service, which is described in this table.

The service_id field identifies each service existing within the transport stream. The service_id field may perform the same function as the program_number field in the PMT.

If the value indicated by the EIT_schedule_flag field is equal to 1, this indicates that EIT schedule information. (EIT schedule flag) for the service exists within the current TS, and, if the value is equal to 0, this indicates that it does not exist.

If the value indicated by the EIT_present_following_flag field is equal to 1, this indicates that EIT_present_following information for the service exists within the current TS, and, if the value is equal to 0, this indicates that it does not exist.

The running_status field indicates a status of the service. For example, if the value of the running_status field is equal to 1, this may indicate that the service is "not running", if the value is equal to 2, this may indicate that the service "starts in a few seconds", if the value is equal to 3, this may indicate that the service is "pausing", if the value is equal to 4, th8is may indicate that the service is "running", and, if the value is equal to 5, this may indicate "service off-air".

If the value indicated by the free_CA_mode field is equal to 0, this indicates that the component streams configuring the service are not scrambled, and, if the value is equal to 1, this indicates that the access respective to one or more streams is controlled by a CA system. CA system is an abbreviation (or short name) for Conditional Access System, which refers to a system providing an encryption function of a broadcasting content in order to limit the viewing of the broadcast to contractors only and a function allowing only the contractor(s) to decipher the encryption and view the broadcasting content.

The descriptors_loop_length field indicates an added value of the lengths of the descriptors following this field.

The descriptor( ) refers to a descriptor describing each service. The broadcasting network program descriptor and/or IP network program descriptor according to the exemplary embodiment of the present invention may correspond to the above-described descriptor( ).

The CRC_32 field indicates a CRC value that is used for verifying whether or not an error exists in the data included in this table section.

FIG. 24 illustrates a syntax of an EIT (Event Information Table) according to an exemplary embodiment of the present invention.

The broadcasting network program descriptor and/or IP network program metadata according to the exemplary embodiment of the present invention may be included in an event level descriptor of the EIT according to the exemplary embodiment of the present invention.

The EIT according to the exemplary embodiment of the present invention includes a table_id field, a section_syntax_indicator field, a section_length field, a service_id field, a version_number field, a current_next_indicator field, a section_number field, a last_section_number field, a transport_stream_id field, an original__id field, a segment_last_section_number field, a last_table_id field, an event_id field, a start_time field, a duration field, a running_status field, a free_CA_mode field, a descriptors_loop_length field, a descriptor( ), and/or a CRC_32 field.

The table_id field identifies a table type. The table_id field may perform a function indicating that this table section corresponds to a section configuring the EIT.

The section_syntax_indicator field indicates a format of a table section following this field. If the value of this field is equal to 0, this indicates that this table section corresponds to a short format. If the value of this field is equal to 1, this table section follows the general long format.

The section_length field indicates a length of this table section. The section_length field may indicate a length starting from after this field to the end of this table section.

The service_id field identifies each service existing within the transport stream. The service_id field may perform the same function as the program_number field in the PMT.

The version_number field indicates a version number of a private table section. The receiver may use this field and the current_next_indicator field, which will be described later on, so as to locate a most recent table section, among the table section stored in the memory.

If the value indicated by the current_next_indicator field is equal to 1, this indicates that the table that is currently being transmitted is valid, and if the value is equal to 0, this indicates that the table that is currently being transmitted is not currently valid but shall become valid in the future.

The section_number field indicates the indexed order of this section within this table.

The last_section_number field indicates the turn of a last section among the sections configuring this table.

The transport_stream_id field identifies a transport stream (TS) that is intended to be described in this table.

The original__id field may identify a first (or original) broadcasting station that has transmitted the service or event, which is described in this table.

The segment_last_section_number field indicates a last section number of the corresponding segment, in case a sub table exists. In case the sub table is not divided, the value indicated by this field may indicate the same value as the value indicated by the last_section_number field.

The last_table_id field indicates the last table_id used.

The event_id field identifies each of the events and has a unique value within a service.

The start_time field indicates a start time of the corresponding event.

The duration field indicates a duration time of the corresponding event. For example, in case of a program that lasts for 1 hour 45 minutes 30 seconds, the duration field may indicate a value of 0x14530.

The running_status field indicates a status of the corresponding event.

If the value indicated by the free_CA_mode field is equal to 0, this indicates that the component streams configuring the service are not scrambled, and, if the value is equal to 1, this indicates that the access respective to one or more streams is controlled by a CA system. CA system is an abbreviation (or short name) for Conditional Access System, which refers to a system providing an encryption function of a broadcasting content in order to limit the viewing of the broadcast to contractors only and a function allowing only the contractor(s) to decipher the encryption and view the broadcasting content.

The descriptors_loop_length field indicates an added value of the lengths of the descriptors following this field.

The descriptor( ) refers to a descriptor describing each event. The broadcasting network program descriptor and/or IP network program descriptor according to the exemplary embodiment of the present invention may correspond to the above-described descriptor( ).

The CRC_32 field indicates a CRC value that is used for verifying whether or not an error exists in the data included in this table section.

FIG. 25 illustrates a syntax of a TVCT (Terrestrial Virtual Channel Table) according to an exemplary embodiment of the present invention.

The broadcasting network program descriptor and/or IP network program metadata according to the exemplary embodiment of the present invention may be included in a channel level descriptor of the TVCT according to the exemplary embodiment of the present invention.

The TVCT (Terrestrial Virtual Channel Table) according to the exemplary embodiment of the present invention includes a table_id field, a section_syntax_indicator field, a private_indicator field, a section_length field, a transport_stream_id field, a version_number field, a current_next_indicator field, a section_number field, a last_section_number field, a protocop_version field, a num_channels_in_section field, a short_name field, a major_channel_number field, a minor_channel_number field, a modulation mode field, a carrier_frequency field, a channel_TSID field, a program_number field, an ETM_location field, an access_controlled field, a hidden field, a hide_guide field, a service_type field, a source_id field, a descriptors_length field, and/or a descriptor( ).

The table_id field identifies the table.

The section_syntax_indicator field is a 1-bit field that is set to 1 in order to indicate a long format of a MPEG-2 private_section table. (This 1-bit field shall be set to '1' to always indicate the "long" form of the MPEG-2 private_section table.)

The private_indicator field is a 1-bit field that is set to 1. (This 1-bit field shall be set to '1'.)

The section_length field indicates a length of the table section following this field in number of bytes. (This is a 12-bit field, the first two bits of which shall be "00". It specifies the number of bytes of the section, starting immediately following the section_length field and including the CRC. The section_length shall not exceed 1 021 so that the entire section has a maximum length of 1 024 bytes.)

The transport_stream_id field indicates an identifier of a MPEG-2 Transport stream (Transport Strema: TS) existing in the table. (To distinguish each transport stream within a single network (terrestrial, cable or satellite) from another, MPEG-2 established the use of a 16-bit (ranging from 0 to 65535) transport_stream_identifier, which is also called a TSID.)

The version_number field is a 5-bit field indicating a version number of the table. (This 5-bit field is the version number of the PSIP_section. The version_number shall be incremented by 1 modulo 32 when a change in the information carried within the PSIP_section occurs. When the current_next_indicator is set to '0', then the version_number shall be that of the next applicable PSIP_section with the same table_id, table_id_extension, and section_number.)

The current_next_indicator field is a 1-bit field, which indicates whether this table is currently applicable or is applicable next time. (A 1-bit field, which when set to '1' indicates that the PSIP_section sent is currently applicable. When the current_next_indicator is set to '1', then the version_number shall be that of the currently applicable PSIP_section. When the bit is set to '0', it indicates that the PSIP_section sent is not yet applicable and shall be the next PSIP_section with the same section_number, table_id_extension, and table_id to become valid.)

The section_number field indicates a number of the section. (This 8-bit field gives the number of the PSIP_section. The section number of the first section in a PSIP table shall be 0x00. The section_number shall be incremented by 1 with each additional section in PSIP table. The scope of the section_number shall be defined by the table_id and table_id_extension. That is, for each PSIP table and value of the table_id_extension field, there is the potential for the full range of section_number values.)

The last_section_number field identifies a number of the last section. (This 8-bit field specifies the number of the last section (that is, the section with the highest section_number) of the PSIP table of which this section is a part. Its scope is the same as for the section_number field.)

The protocop_version field is a field having a function for authorizing the current table, which transmits a parameter that is different from the parameter defined in the current protocol, in a future usage. (An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

The num_channels_in_section field indicates a number of virtual channel resolutions. (The num_channels_in_section field in ATSC Cable Virtual Channel table CVCT table sections is an eight-bit field that indicates the number of virtual channel definitions to follow in the table section.)

The short_name field is a 112-bit field indicating a short name for the virtual channel. (The short_name field is a 112-bit field in ATSC CVCT table sections that gives the short_name for the virtual channel. Each letter of the short_name is formatted as a 16-bit Unicode character, with the high order byte transmitted first. So, short_name for TVCT and CVCT entries is seven Unicode characters, which short_name for SVCT entries is eight Unicode characters. If the display name is less than the number of permitted characters, 0/0x00 is appended to the end until the alloted number of bits has been reached.)

The major_channel_number field indicates a number of major channels associated with the virtual channel. (A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT.)

The minor_channel_number field indicates a number of minor channels associated with the virtual channel. (A 10-bit number in the range 0 to 999 that represents the "minor" or "sub"-channel number. This field, together with major_channel_number, performs as a two-part channel number, where minor_channel_number represents the second or right-hand part of the number. When the service_type is analog television, minor_channel_number shall be set to 0.)

The modulation mode field indicates a modulation scheme respective to a transport carrier of the virtual channel. (The modulation_mode is an eight-bit field in a virtual channel entry tells receivers the modulation used to transmit individual channels.)

The carrier_frequency field transmits carrier frequency information used by the transmission (or transport) virtual channel. (The carrier frequency is a 32-bit field that transmits the carrier frequency used by the transport carrying the virtual channel.)

The channel_TSID field indicates a MPEG-2 Transport Stream ID respective to a Transport Stream (TS) transmitting a MPEG-2 program associated with the virtual channel. (The channel_TSID is a 16-bit unsigned integer field that gives the transport_stream_id of the channel that carries (or for inactive channels, will carry) the virtual channel.)

The program_number field identifies each program service or virtual channel within the TS. (The program_number is a 16-bit unsigned integer that uniquely identifies each program service (or virtual channel) present in a transport stream.)

The ETM_location field indicates the presence or absence of an extended text message for a channel, event, or data event. (The ETM_location field denotes whether there is an extended text message for the channel (Channel Extended Text table or CETT), event (Event Extended Text table) or data event (Data Extended Text table).)

The access_controlled field indicates whether or not an event associated with the corresponding virtual channel can be controlled. (When access_controlled is set to '1', means that events associated with this virtual channel may be access controlled. When set to '0', access to event is not controlled.)

The hidden field indicates whether or not the corresponding channel can be accessed by a direct entry (or field, attribute, entity) of a virtual channel index (or number). (When hidden is set to '1', means the channel cannot be accessed by direct entry of the virtual channel number. When set to '0', virtual can be accessed by direct entry.)

The hide_guide field indicates whether or not the corresponding channel can be accessed by a direct entry (or field, attribute, entity) of a virtual channel index (or number). (When hide_guide is set to '1', means the channel cannot be accessed by direct entry of the virtual channel number. When set to '0', virtual can be accessed by direct entry.)

The service_type field identifies a service type that is set in the virtual channel. (The service_type is a 6-bit enumerated field that identifies the type of service set in the virtual channel.) As an exemplary embodiment for a UHD service, the service type may be designated as parameterized service (0x07), extended parameterized service (0x09) or new DTV service-scalable UHDTV (0x10). The above-described service name and value correspond to an exemplary embodiment, and, therefore, the service name and value may be set to other names or values.

The source_id field corresponds to a 16-bit unsigned integer, which indicates a programming source associated with the virtual channel. (A 16-bit unsigned integer number that identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

The descriptors_length filed transmits a byte length of a next descriptor field. (The descriptors_length is a 10-bit unsigned integer field that signals the length in bytes of the descriptor field to follow. If there are no descriptors present, zero would be appropriate.)

The descriptor( ) field is a descriptor loop located within the table. The descriptor loop may include an additional descriptor. The broadcasting network program descriptor and/or IP network program descriptor according to the exemplary embodiment of the present invention may correspond to the above-described descriptor( ).

FIG. 26 illustrates a syntax of a CVCT (Cable Virtual Channel Table) according to an exemplary embodiment of the present invention.

The broadcasting network program descriptor and/or IP network program metadata according to the exemplary embodiment of the present invention may be included in a channel level descriptor of the CVCT according to the exemplary embodiment of the present invention.

The TVCT (Terrestrial Virtual Channel Table) according to the exemplary embodiment of the present invention includes a table_id field, a section_syntax_indicator field, a private_indicator field, a section_length field, a transport_stream_id field, a version_number field, a current_next_indicator field, a section_number field, a last_section_number field, a protocop_version field, a num_channels_in_section field, a short_name field, a major_channel_number field, a minor_channel_number field, a modulation mode field, a carrier_frequency field, a channel_TSID field, a program_number field, an ETM_location field, an access_controlled field, a hidden field, a path_select field, an out_of_band field, a hide_guide field, a service_type field, a source_id field, a descriptors_length field, and/or a descriptor( ).

The table_id field identifies the table.

The section_syntax_indicator field is a 1-bit field that is set to 1 in order to indicate a long format of a MPEG-2 private_section table. (This 1-bit field shall be set to '1' to always indicate the "long" form of the MPEG-2 private_section table.)

The private_indicator field is a 1-bit field that is set to 1. (This 1-bit field shall be set to '1'.)

The section_length field indicates a length of the table section following this field in number of bytes. (This is a 12-bit field, the first two bits of which shall be "00". It specifies the number of bytes of the section, starting immediately following the section_length field and including the CRC. The section_length shall not exceed 1 021 so that the entire section has a maximum length of 1 024 bytes.)

The transport_stream_id field indicates an identifier of a MPEG-2 Transport stream (Transport Strema: TS) existing in the table. (To distinguish each transport stream within a single network (terrestrial, cable or satellite) from another, MPEG-2 established the use of a 16-bit (ranging from 0 to 65535) transport_stream_identifier, which is also called a TSID.)

The version_number field is a 5-bit field indicating a version number of the table. (This 5-bit field is the version number of the PSIP_section. The version_number shall be incremented by 1 modulo 32 when a change in the information carried within the PSIP_section occurs. When the current_next_indicator is set to '0', then the version_number shall be that of the next applicable PSIP_section with the same table_id, table_id_extension, and section_number.)

The current_next_indicator field is a 1-bit field, which indicates whether this table is currently applicable or is applicable next time. (A 1-bit field, which when set to '1' indicates that the PSIP_section sent is currently applicable. When the current_next_indicator is set to '1', then the version_number shall be that of the currently applicable PSIP_section. When the bit is set to '0', it indicates that the PSIP_section sent is not yet applicable and shall be the next PSIP_section with the same section_number, table_id_extension, and table_id to become valid.)

The section_number field indicates a number of the section. (This 8-bit field gives the number of the PSIP_section. The section_number of the first section in a PSIP table shall be 0x00. The section_number shall be incremented by 1 with each additional section in PSIP table. The scope of the section_number shall be defined by the table_id and table_id_extension. That is, for each PSIP table and value of the table_id_extension field, there is the potential for the full range of section_number values.)

The last_section_number field identifies a number of the last section. (This 8-bit field specifies the number of the last section (that is, the section with the highest section_number) of the PSIP table of which this section is a part. Its scope is the same as for the section_number field.)

The protocop_version field is a field having a function for authorizing the current table, which transmits a parameter that is different from the parameter defined in the current protocol, in a future usage. (An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

The num_channels_in_section field indicates a number of virtual channel resolutions. (The num_channels_in_section field in ATSC Cable Virtual Channel table CVCT table sections is an eight-bit field that indicates the number of virtual channel definitions to follow in the table section.)

The short_name field is a 112-bit field indicating a short name for the virtual channel. (The short_name field is a 112-bit field in ATSC CVCT table sections that gives the short_name for the virtual channel. Each letter of the short_name is formatted as a 16-bit Unicode character, with the high order byte transmitted first. So, short_name for TVCT and CVCT entries is seven Unicode characters, which short_name for SVCT entries is eight Unicode characters. If the display name is less than the number of permitted characters, 0/0x00 is appended to the end until the alloted number of bits has been reached.)

The major_channel_number field indicates a number of major channels associated with the virtual channel. (A 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between 1 and 99. The value of major_channel_number shall be set such that in no case is a major_channel_number/minor_channel_number pair duplicated within the TVCT.)

The minor_channel_number field indicates a number of minor channels associated with the virtual channel. (A 10-bit number in the range 0 to 999 that represents the "minor" or "sub"-channel number. This field, together with major_channel_number, performs as a two-part channel number, where minor_channel_number represents the second or right-hand part of the number. When the service_type is analog television, minor_channel_number shall be set to 0.)

The modulation mode field indicates a modulation scheme respective to a transport carrier of the virtual channel. (The modulation_mode is an eight-bit field in a virtual channel entry tells receivers the modulation used to transmit individual channels.)

The carrier_frequency field transmits carrier frequency information used by the transmission (or transport) virtual channel. (The carrier frequency is a 32-bit field that transmits the carrier frequency used by the transport carrying the virtual channel.)

The channel_TSID field indicates a MPEG-2 Transport Stream ID respective to a Transport Stream (TS) transmitting a MPEG-2 program associated with the virtual channel. (The channel_TSID is a 16-bit unsigned integer field that gives the transport_stream_id of the channel that carries (or for inactive channels, will carry) the virtual channel.)

The program_number field identifies each program service or virtual channel within the TS. (The program_number is a 16-bit unsigned integer that uniquely identifies each program service (or virtual channel) present in a transport stream.)

The ETM_location field indicates the presence or absence of an extended text message for a channel, event, or data event. (The ETM_location field denotes whether there is an extended text message for the channel (Channel Extended Text table or CETT), event (Event Extended Text table) or data event (Data Extended Text table).)

The access_controlled field indicates whether or not an event associated with the corresponding virtual channel can be controlled. (When access_controlled is set to '1', means that events associated with this virtual channel may be access controlled. When set to '0', access to event is not controlled.)

The hidden field indicates whether or not the corresponding channel can be accessed by a direct entry (or field, attribute, entity) of a virtual channel index (or number). (When hidden is set to '1', means the channel cannot be accessed by direct entry of the virtual channel number. When set to '0', virtual can be accessed by direct entry.)

The path_select field is a field within the CVCT that associates the virtual channel with a transmission path of an active channel. (The path_select is a 1-bit field in a Cable Virtual Channel table (CVCT) entry that associates a virtual channel with a transmission path of an active channel or when the channel will be active.)

The out_of_band field indicates whether or not the virtual channel is being transmitted to an OOB (Out-Of-Band)

physical transmission channel. (The out_of_band is a 1-bit Boolean field in a Cable Virtual Channel table entry that when set to '1' is carried on the out-of-band physical transmission channel. When clear or '0', the virtual channel is carried within a tuned multiplex. When the channel is inactive, out_of_band reflects the channel that will be valid when the channel is again active.)

The hide_guide field indicates whether or not the corresponding channel can be accessed by a direct entry (or field, attribute, entity) of a virtual channel index (or number). (When hide_guide is set to '1', means the channel cannot be accessed by direct entry of the virtual channel number. When set to '0', virtual can be accessed by direct entry.)

The service_type field identifies a service type that is set in the virtual channel. (The service_type is a 6-bit enumerated field that identifies the type of service set in the virtual channel.) As an exemplary embodiment for a UHD service, the service type may be designated as parameterized service (0x07), extended parameterized service (0x09) or new DTV service-scalable UHDTV (0x10). The above-described service name and value correspond to an exemplary embodiment, and, therefore, the service name and value may be set to other names or values.

The source_id field corresponds to a 16-bit unsigned integer, which indicates a programming source associated with the virtual channel. (A 16-bit unsigned integer number that identifies the programming source associated with the virtual channel. In this context, a source is one specific source of video, text, data, or audio programming. Source ID value zero is reserved. Source ID values in the range 0x0001 to 0x0FFF shall be unique within the Transport Stream that carries the VCT, while values 0x1000 to 0xFFFF shall be unique at the regional level. Values for source_ids 0x1000 and above shall be issued and administered by a Registration Authority designated by the ATSC.)

The descriptors_length filed transmits a byte length of a next descriptor field. (The descriptors_length is a 10-bit unsigned integer field that signals the length in bytes of the descriptor field to follow. If there are no descriptors present, zero would be appropriate.)

The descriptor( ) field is a descriptor loop located within the table. The descriptor loop may include an additional descriptor. The broadcasting network program descriptor and/or IP network program descriptor according to the exemplary embodiment of the present invention may correspond to the above-described descriptor( ).

According to the exemplary embodiment of the present invention, in case of cable broadcasting, in case an OOB-SI is transmitted, a broadcasting network program descriptor and/or IP network program descriptor may be included in the channel level.

Figure 27:
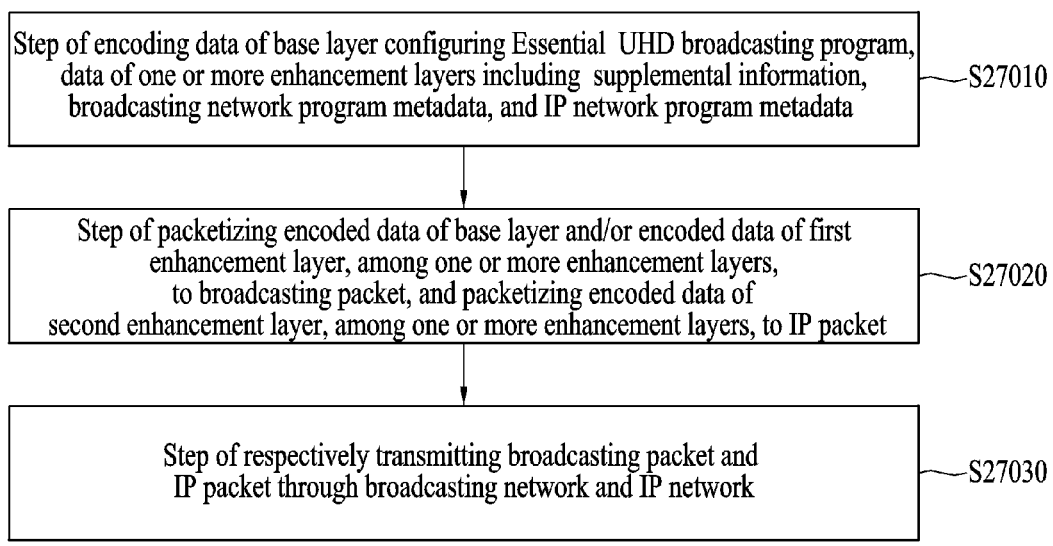
FIG. 27 illustrates a method for transmitting advanced UHD broadcasting content according to an exemplary embodiment of the present invention.

FIG. 27 illustrates a method for transmitting advanced UHD broadcasting content according to an exemplary embodiment of the present invention.

According to the exemplary embodiment of the present invention, the advanced UHD broadcasting content may be transmitted by undergoing the following procedures. Firstly, the transmitting end encodes data of a base layer configuring the Essential UHD broadcasting program, data of one or more enhancement layers including supplemental information, which is required for providing the advanced UHD broadcasting program based upon the data of the base layer, broadcasting network program metadata including information on the advanced UHD broadcasting program being transmitted through the broadcasting network, and IP network program metadata including information on advanced UHD broadcasting program being transmitted through the IP network (S27010). As a following procedure, the transmitting end packetizes the encoded data of the base layer and/or the encoded data of the first enhancement layer, among the one or more enhancement layers, to a broadcasting packet and packetizes the encoded data of the second enhancement layer, among the one or more enhancement layers, to an IP packet (S27020). Finally, the transmitting end transmits the broadcasting packet, which is packetized in the above-described procedure, through the broadcasting network and transmits the IP packet through the IP network (S27030). Herein, the detailed description of the transmission procedure will be replaced with the description on FIGS. 1 to 3 and FIG. 5 of this specification. And, the detailed description of the above-described broadcasting network program metadata and IP network program metadata will be replaced with the description on FIGS. 9, 15, 17, and 20 of this specification.

According to another exemplary embodiment of the present invention, the broadcasting network program metadata may include program type information, which indicates a type of UHD broadcasting program that can be finally provided by the data of the layer being transmitted through the broadcasting network, number of layer information, which indicates a number of layers being transmitted through the broadcasting network, number of layer combination information, which indicates a number of layer combinations being transmitted through the broadcasting network, and/or layer combination type information, which indicates combination information of layers being transmitted through the broadcasting network. The detailed description on the information included in the above-described broadcasting network program metadata will be replaced with the description on FIGS. 9 and 15 of this specification.

According to yet another exemplary embodiment of the present invention, the broadcasting network program metadata may include layer identification information, which identifies each layer being transmitted through the broadcasting network, layer encoding type information, which indicates the codec type used by each layer being transmitted through the broadcasting network, layer elementary stream packet identification information, which indicates packet identification information of an elementary stream including the data of each layer being transmitted through the broadcasting network, and/or scalable type information, which indicates scalable items that can be simultaneously provided by each layer being transmitted through the broadcasting network. The detailed description on the information included in the above-described broadcasting network program metadata will be replaced with the description on FIGS. 9 and 15 of this specification.

According to yet another exemplary embodiment of the present invention, the IP network program metadata may include Is scalable flag information, which indicates whether or not the data of the layer being transmitted through the IP network is encoded by using a scalable codec, number of IP network layer information, which indicates the number of layers being transmitted through the IP network, number of IP network layer combination information, which indicates the number of layer combinations being transmitted through the IP network, and/or IP network layer combination type information, which indicates combination information of the layers being transmitted through the IP network. The detailed description on the information included in the above-described IP network program metadata will be replaced with the description on FIGS. 17 and 20 of this specification.

According to yet another exemplary embodiment of the present invention, the IP network program metadata may include IP network layer identification information, which identifies each layer being transmitted through the IP network, IP network elementary stream packet identification information, which indicates packet identification information of the elementary stream including the data of each layer being transmitted through the IP network, and/or IP linkage information, which indicates information on a transmission path of the data of each layer being transmitted through the IP network. The detailed description on the information included in the above-described IP network program metadata will be replaced with the description on FIGS. 17 and 20 of this specification.

According to yet another exemplary embodiment of the present invention, the IP linkage information may include IP address type information, which indicates a type of IP address that can receive the data of each layer being transmitted through the IP network, IP address information, which indicates an IP address having an IP address type respective to the IP address type information, and/or port number information, which indicates a UDP port number that can receive the data of each layer being transmitted through the IP network. The detailed description on the information included in the above-described IP linkage information will be replaced with the description on FIG. 19 of this specification.

According to yet another exemplary embodiment of the present invention, the broadcasting network program metadata and IP network program metadata may be included in the PMT, SDT, EIT, TVCT, or CVCT in a descriptor format and may then be transmitted. The detailed description on the above-described PMT, SDT, EIT, TVCT, or CVCT will be replaced with the description on FIGS. 22 to 26 of this specification.

Although the drawings have been distinguished and divided in order to facilitate the description of the present invention, the present invention may provide a design for configuring a new embodiment by combining some of the previously described embodiments of the present invention. Moreover, whenever required by anyone skilled in the art, the scope of the present invention includes designing a recording medium readable by a computer, the computer having a program for executing the above-described embodiments of the present invention recorded therein.

As described above, the device and method according to the present invention may not be limited only to the above-described configuration and methods according to the exemplary embodiments of the present invention, and, therefore, variations of the exemplary embodiments of the present invention may be configured by selectively combining each exemplary embodiment of the present invention fully or in part.

Meanwhile, the video processing method according to the present invention may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROMs, RAMs, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

Also, a device invention and a method invention are both described in this specification. Therefore, whenever required, the description of both inventions may be supplementarily applied.

Mode for Carrying Out the Present Invention

As described above, the mode for carrying out the present invention is described as a best mode for carrying out the present invention.

INDUSTRIAL APPLICABILITY

The present invention is applicable throughout the entire broadcasting industry.

What is claimed is:
1. A method for transmitting advanced UHD (Ultra High Definition) broadcasting content, comprising the steps of:
generating a base layer stream by encoding data configuring an essential UHD broadcasting program;
generating a plurality of enhancement layer streams by encoding a plurality of scalable resolution information based on the base layer stream, the plurality of scalable resolution information being used for providing an advanced UHD broadcasting program;
generating broadcasting network program metadata including, information on streams transmitted through a broadcasting network among streams configuring a UHD broadcasting program and IP (internet protocol) network program metadata including information on streams transmitted through an IP network among the streams configuring the UHD broadcasting program,
wherein the broadcasting network program metadata includes first combination information indicating whether each stream transmitted through the broadcasting network among the base layer stream and the plurality of enhancement layer streams configures the UHD broadcasting program and first resolution information indicating a resolution provided by a combination of streams configuring the UHD broadcasting program among streams transmitted through the broadcasting network according to the first combination information,
wherein the IP network program metadata includes second combination information indicating that each stream transmitted through the IP network among the plurality of enhancement layer streams configures the UHD broadcasting program and second resolution information indicating a resolution provided by a combination of streams configuring the UHD broadcasting program among streams transmitted through the IP network according to the second combination information, wherein the first combination information has a value and the value of the first combination information is different from a value of the second combination information, wherein the UHD broadcasting, program has a resolution, and the resolution of the UHD broadcasting program is provided by both of the streams transmitted through the broadcasting network and the streams transmitted through the IP network among the streams configuring the UHD broadcasting program according to the first combination information and the second combination information;

packetizing the streams transmitted through the broadcasting network to broadcasting packets;

packetizing the streams transmitted through the IP network to IP packets;

transmitting the broadcasting packets through the broadcasting ; and transmitting the IP packets through the IP network.

2. The method of claim 1, wherein the broadcasting network program metadata include program type information indicating a type of UHD broadcasting program that is capable of finally being provided by the streams transmitted through the broadcasting network and a number of layer information indicating a number of the streams transmitted through the broadcasting network.

3. The method of claim 1, wherein the broadcasting network program metadata include broadcast stream identification information identifying the streams transmitted through the broadcasting network, layer encoding type information indicating the codec type used by the streams transmitted through the broadcasting network, broadcast stream packet identification information indicating packet identification information of the streams transmitted through the broadcasting network and information indicating a scalable resolution information provided the streams identified by the broadcast stream identification information among the plurality of scalable resolution information, and wherein the plurality of scalable resolution includes resolution information, frame rate information, bit depth information, Chroma sub sampling information, color gamut information, and dynamic range information.

4. The method of claim 1, wherein the IP network program metadata include scalable flag information indicating whether or not the streams transmitted through the IP network are encoded by using a scalable codec and a number of IP network stream information indicating the number of the streams transmitted through the IP network.

5. The method of claim 3, wherein the IP network program metadata include IP network stream identification information identifying the streams transmitted through the IP network, IP network stream packet identification information indicating packet identification information of the streams transmitted through the IP network, and IP linkage information indicating information on a transmission path of the streams transmitted through the IP network, and wherein the broadcast stream identification information has a value, and the value of the broadcast stream identification information is different from a value of the IP network stream identification information.

6. The method of claim 5, wherein the IP linkage information include IP address type information indicating a type of IP address that is capable of receiving the streams transmitted through the IP network, IP address information indicating an IP address having an IP address type respective to the IP address type information, and port number information indicating a user datagram protocol (UDP) port number that is capable of receiving the streams transmitted through the IP network.

7. The method of claim 1, wherein the IP network program metadata includes channel linkage information indicating information on a transmitting path of additional data provided by other networks besides the IP network, and wherein the channel linkage information includes information indicating a type of a network by which the additional data is transmitted, information identifying a provider providing the additional data and information identifying a transport stream transmitting, the additional data.

8. A device for receiving advanced UHD (Ultra High Definition) broadcasting content, comprising:

a receiving unit configured to receive, through a broadcasting network and an IP network a base layer stream configuring an essential UHD broadcasting program and a plurality of enhancement layer streams including a plurality of scalable resolution information which is used for providing an advanced UHD broadcasting program, wherein the receiving unit receives broadcasting network program metadata including information on streams transmitted through the broadcasting network among streams configuring an UHD broadcasting program and IP network program metadata including information on streams transmitted through the IP network among the streams configuring the UHD broadcasting program, wherein the broadcasting network program metadata includes first combination information indicating whether each stream transmitted through the broadcasting network among, the base laser stream and the plurality of enhancement layer streams configures the UHD broadcasting program and first resolution information indicating a resolution provided by a combination of streams configuring the UHD broadcasting program among streams transmitted through the broadcasting network according to the first combination information, wherein the IP network program metadata includes second combination information indicating that each stream transmitted through the IP network among the plurality of enhancement layer streams configures the UHD broadcasting program and second resolution information indicating a resolution provided by a combination of streams configuring, the UHD broadcasting program among, streams transmitted through the IP network according to the second combination information, wherein the first combination information has a value, and the value of the first combination information is different from a value of the second combination information, wherein the UHD broadcasting program has a resolution, and the resolution of the UHD broadcasting program is provided by both of the streams transmitted through the broadcasting network and the streams transmitted through the IP network among the streams configuring the UHD broadcasting program according to the first combination information and the second combination information;

a decoder configured to decode the streams configuring the UHD broadcasting program according to the first combination information and the second combination information.

9. The device of claim 8, wherein the broadcasting network program metadata include program type information indicating a type of UHD broadcasting program that is capable of finally being provided by the streams transmitted through the broadcasting network and a number of layer information indicating a number of the streams transmitted through the broadcasting network.

10. The device of claim 8, wherein the broadcasting network program metadata include broadcast stream identification information identifying the streams transmitted through the broadcasting network, layer encoding type information indicating the codec type used by the streams transmitted through the broadcasting network, broadcast stream packet identification information indicating packet identification information of the streams transmitted through the broadcasting network and information indicating a scalable resolution information provided by the streams identified by the broadcast stream identification information among the plurality of scalable resolution information, and wherein the plurality of scalable resolution includes resolution information, rate information, bit depth information, chroma sub sampling information, color gamut information and dynamic range information.

11. The device of claim 8, wherein the IP network program metadata include scalable flag information indicating whether or not the streams transmitted through the IP network are encoded by using a scalable codec and number of IP network stream information indicating the number of the streams transmitted through the IP network.

12. The device of claim 10, wherein the IP network program metadata include IP network stream identification information identifying the streams transmitted through the IP network, IP network stream packet identification information indicating packet identification information of the streams transmitted through the IP network, and IP linkage information indicating information on a transmission path of the streams transmitted through the IP network, and wherein the broadcast stream identification information has a value and the value of the broadcast stream identification information is different from a value of the IP network stream identification information.

13. The device of claim 12, wherein the linkage information include IP address type information indicating a type of IP address that is capable of receiving the streams transmitted through the IP network, IP address information indicating an IP address having an IP address type respective to the IP address type information, and port number information indicating a user datagram protocol (UDP) port number that is capable of receiving the streams transmitted through the IP network.

14. The device of claim 8, wherein the IP network program metadata includes channel linkage information indicating information on a transmitting path of additional data provided by other networks besides the IP network, and wherein the channel linkage information includes information indicating a type of a network by which the additional data is transmitted, information identifying a provider providing the additional data and information identifying a transport stream transmitting the additional data.

* * * * *